US012744643B2

(12) United States Patent
Huang et al.

(10) Patent No.: US 12,744,643 B2
(45) Date of Patent: Sep. 22, 2026

(54) FORMULA-BASED INTER-CIRCLE PRECODING WEIGHT DETERMINATION FOR ORBITAL ANGULAR MOMENTUM (OAM) COMMUNICATION SYSTEMS

(71) Applicant: QUALCOMM Incorporated, San Diego, CA (US)

(72) Inventors: Min Huang, Beijing (CN); Danlu Zhang, San Diego, CA (US); Chao Wei, Beijing (CN); Hao Xu, Beijing (CN)

(73) Assignee: QUALCOMM Incorproated, San Diego, CA (US)

( * ) Notice: Subject to any disclaimer, the term of this patent is extended or adjusted under 35 U.S.C. 154(b) by 238 days.

(21) Appl. No.: 18/703,889

(22) PCT Filed: Dec. 23, 2021

(86) PCT No.: PCT/CN2021/140795
§ 371 (c)(1),
(2) Date: Apr. 23, 2024

(87) PCT Pub. No.: WO2023/115452
PCT Pub. Date: Jun. 29, 2023

(65) Prior Publication Data
US 2026/0197139 A1 Jul. 9, 2026

(51) Int. Cl.
*H04L 5/00* (2006.01)
*H04B 7/0404* (2017.01)

(52) U.S. Cl.
CPC ......... *H04L 5/0051* (2013.01); *H04B 7/0404* (2013.01)

(58) Field of Classification Search
CPC ............................ H04L 5/0051; H04B 7/0404
See application file for complete search history.

(56) References Cited

U.S. PATENT DOCUMENTS

2020/0119785 A1 4/2020 Varatharaajan et al.
2020/0296599 A1* 9/2020 Sasaki .................. H04B 7/0469
2024/0120977 A1* 4/2024 Zhu ........................ H04L 1/1614

FOREIGN PATENT DOCUMENTS

CN 112803975 A 5/2021
CN 113747575 A 12/2021
(Continued)

OTHER PUBLICATIONS

International Search Report and Written Opinion—PCT/CN2021/140795—ISA/EPO—Jun. 6, 2022.
(Continued)

*Primary Examiner* — Elton Williams
(74) *Attorney, Agent, or Firm* — Shumaker & Sieffert, P.A.

(57) ABSTRACT

Aspects of the disclosure relate to formula-based inter-circle precoding weight determination for orbital angular momentum (OAM) communication systems. Some aspects of the disclosure relate to apparatuses and methods for wireless communication, an apparatus comprising: a processor, antenna elements, comprising a first subset and a second subset of antenna elements; and a memory coupled to the processor, the memory storing instructions that, when executed by the processor, cause the processor to: transmit, via the first subset of antenna elements, a first reference signal using a first OAM mode; transmit, via the second subset of antenna elements, a second reference signal using the first OAM mode; and receive information indicative of a subset of antenna elements of the plurality of antenna elements to use to transmit the first OAM mode. Other aspects, embodiments, and features are also claimed and described.

30 Claims, 10 Drawing Sheets

(56) References Cited

FOREIGN PATENT DOCUMENTS

| | | | |
|---|---|---|---|
| CN | 113765550 | A | 12/2021 |
| WO | 2019059407 | A1 | 3/2019 |
| WO | 2019059408 | A1 | 3/2019 |
| WO | 2021066497 | A1 | 4/2021 |
| WO | 2021244532 | A1 | 12/2021 |
| WO | 2022266871 | A1 | 12/2022 |

OTHER PUBLICATIONS

Supplementary European Search Report—EP21968595—Search Authority—Munich—Jul. 14, 2025.
Taiwan Search Report—TW111145828—TIPO—Jun. 4, 2026.

* cited by examiner

FORMULA-BASED INTER-CIRCLE PRECODING WEIGHT DETERMINATION FOR ORBITAL ANGULAR MOMENTUM (OAM) COMMUNICATION SYSTEMS

This application is a national stage application under 35 U.S.C. § 371 of PCT Application No. PCT/CN2021/140795, filed Dec. 23, 2021. The entire content of PCT Application No. PCT/CN2021/140795 is incorporated herein by reference in its entirety.

TECHNICAL FIELD

The technology discussed below relates generally to wireless communication systems, and more particularly, to transmission and reception of reference signals. For example, some aspects of the disclosed technology can provide and enable techniques for calculating precoding weights for orbital angular momentum (OAM) transmission systems.

Introduction

In wireless communication, information is transmitted over electromagnetic radiation by modulating a carrier signal with one or more information signals. Many techniques for modulating a carrier signal are used in the art, including various analog and digital modulation techniques such as frequency modulation (FM), amplitude modulation (AM), phase-shift keying (PSK), and quadrature amplitude modulation (QAM), among numerous others. In a typical cellular wireless communication system, many such signals can be multiplexed (e.g., combined) onto a suitable carrier or band to enable simultaneous communication between multiple devices. Once again, many techniques for multiplexing and multiple access are used in the art, including frequency-division multiplexing (FDM), time-division multiplexing (TDM), and orthogonal frequency-division multiplexing (OFDM), among many others.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, an apparatus configured for wireless communication is disclosed. In a more particular example, the apparatus includes: a processor; a plurality of antenna elements, comprising a first subset of antenna elements that includes at least a first antenna element and a second antenna element, and a second subset of antenna elements that includes at least a third antenna element and a fourth antenna element; and a memory coupled to the processor, the memory storing instructions that, when executed by the processor, cause the processor to: transmit, via the first subset of antenna elements, a first reference signal using a first orbital angular momentum (OAM) mode; transmit, via the second subset of antenna elements, a second reference signal using the first OAM mode; and receive information indicative of a subset of antenna elements of the plurality of antenna elements to use to transmit the first OAM mode.

In another example, another apparatus configured for wireless communication is disclosed. In a more particular example, the apparatus includes: a processor; a plurality of antenna elements, comprising a first subset of antenna elements that includes at least a first antenna element and a second antenna element, and a second subset of antenna elements that includes at least a third antenna element and a fourth antenna element; and a memory coupled to the processor, the memory storing instructions that, when executed by the processor, cause the processor to: receive, from a transmitting apparatus comprising a third subset of antenna elements and a fourth subset of antenna elements, an indication that the third subset of antenna elements are to be used to transmit a first reference signal for a first orbital angular momentum (OAM) mode; receive, from a transmitting apparatus, an indication that the fourth subset of antenna elements are to be used to transmit a second reference signal for the first OAM mode; and transmit information indicative of a subset of antenna elements of the plurality of antenna elements that was used to receive the first reference signal.

In yet another example, a method for wireless communication is disclosed. In a more particular example, the method includes: transmitting, via a first subset of antenna elements of a plurality of antenna elements, a first reference signal using a first orbital angular momentum (OAM) mode; transmitting, via a second subset of antenna elements of a plurality of antenna elements, a second reference signal using the first OAM mode; and receiving information indicative of a subset of antenna elements of the plurality of antenna elements to use to transmit the first OAM mode.

In yet another example, another method for wireless communication is disclosed. In a more particular example, the method includes: receiving, at a receiving apparatus including a plurality of antenna elements including a first subset of antenna elements and a second subset of antenna elements and from a transmitting apparatus including a third subset of antenna elements and a fourth subset of antenna elements, an indication that the third subset of antenna elements are to be used to transmit a first reference signal for a first orbital angular momentum (OAM) mode; receiving, from the transmitting apparatus, an indication that the fourth subset of antenna elements are to be used to transmit a second reference signal for the first OAM mode; and transmitting information indicative of a subset of antenna elements of the plurality of antenna elements that was used to receive the first reference signal.

DETAILED DESCRIPTION

Figure 1:
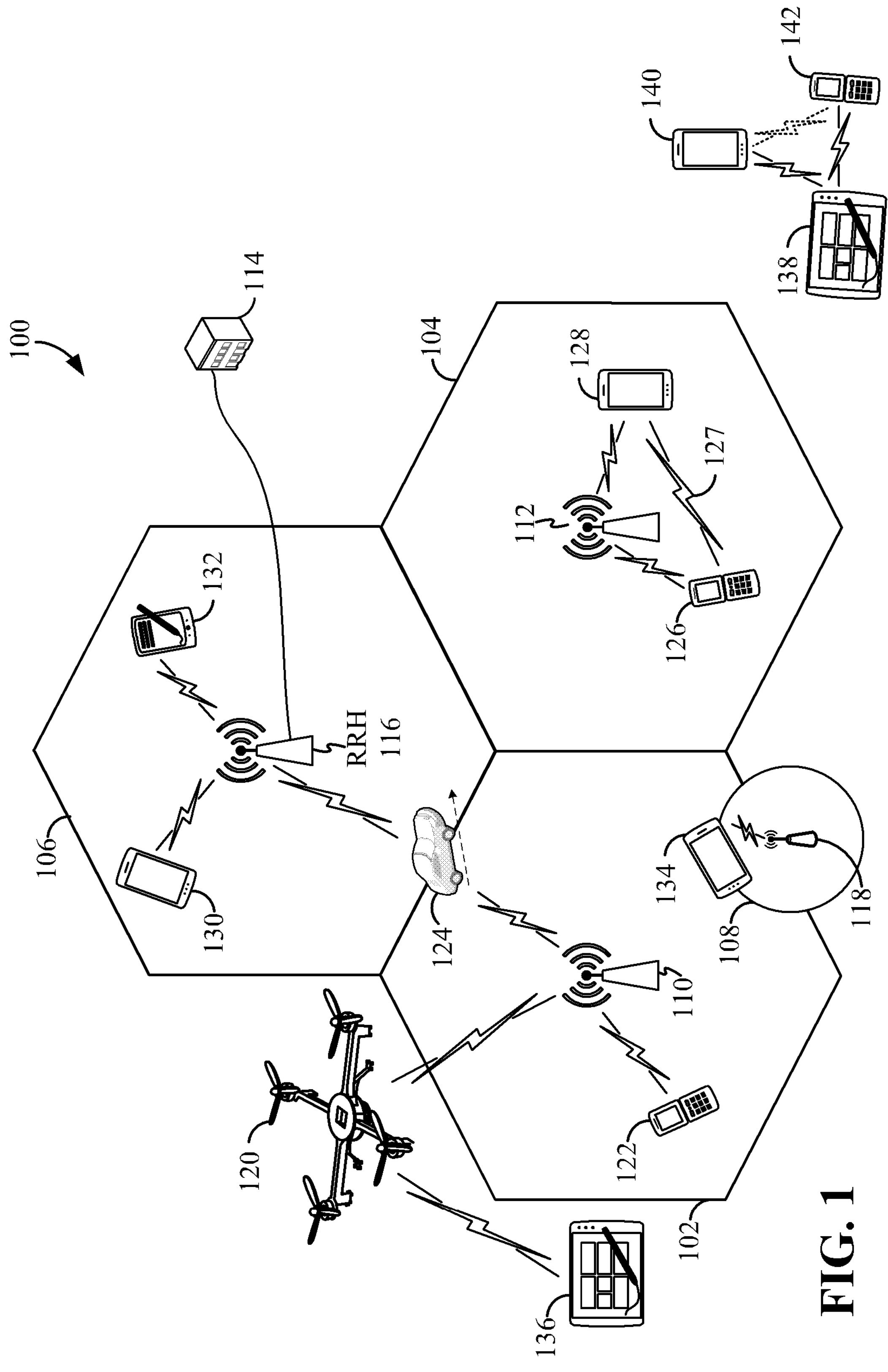
FIG. 1 is a schematic illustration of a radio access network according to some aspects of this disclosure.

In some aspects, this disclosure provides for a wireless communication technique that exploits an orbital angular momentum (OAM) property of electromagnetic (EM) waves for modulating a carrier to carry information, and/or for multiplexing information streams onto a common wireless resource. In particular, a coaxial multi-circle uniform circular array (UCA)-based antenna may be utilized to transmit reference signals for multiple OAM modes using a predetermined sequence of resources, such that a receiving device may determine resources that are to be used to be used to transmit subsequent reference signals based on the detection of a reference signal for a particular mode. Other aspects, embodiments, and features are also described and claimed.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

In communication systems, modulation is a technique for systematically varying a carrier signal in such a way that the transmitted signal contains information. Many techniques for modulating a carrier signal are used in the art, including various analog and digital modulation techniques. Modern wireless communication devices often employ quadrature amplitude modulation (QAM), where a pair of quadrature (orthogonal) carrier signals have their amplitudes controlled to represent a desired location in a complex plane (sometimes referred to as a Gauss plane).

Relatedly, multiplexing and multiple access are techniques for enabling simultaneous communication of multiple signals and/or devices on the same channel. For example, 5G New Radio (NR) specifications provide multiple access for uplink transmissions from mobile devices to base stations, and for multiplexing for downlink transmissions from base stations to mobile devices, utilizing orthogonal frequency division multiplexing (OFDM) with a cyclic prefix (CP). In addition, for uplink transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes. For example, a mobile device may provide for uplink multiple access utilizing time division multiple access (TDMA), code division multiple access (CDMA), frequency division multiple access (FDMA), sparse code multiple access (SCMA), resource spread multiple access (RSMA), orbital angular momentum (OAM) multiple access, coaxial multi-circle antenna multiple access, and/or other suitable multiple access schemes. Further, a base station may multiplex DL transmissions to UEs utilizing time division multiplexing (TDM), code division multiplexing (CDM), frequency division multiplexing (FDM), orthogonal frequency division multiplexing (OFDM), sparse code multiplexing (SCM), orbital angular momentum (OAM) multiplexing, coaxial multi-circle antenna multiplexing, and/or other suitable multiplexing schemes.

OAM

An EM transmission can be characterized as a wave that carries momentum. In some examples, this momentum can include angular momentum, which includes a spin angular momentum (SAM) component, and an orbital angular momentum (OAM) component. In some cases, the SAM of the EM wave may be associated with the polarization of the EM wave. For example, an EM wave may be associated with different polarizations, such as left, right, and circular polarizations. Accordingly, the SAM of an EM wave may have multiple (e.g., two) degrees of freedom.

In some cases, the OAM of the EM wave may be associated with a field spatial distribution of the EM wave, which may be in the form of a helical or twisted wavefront shape. For example, an EM wave or light beam may be in a helical mode, which may also be referred to as an OAM mode; and such helical mode may be characterized by a wavefront that is shaped as a helix with an optical vortex in the center (e.g., at the beam axis), where each helical mode is associated with a different helical wavefront structure. The helical modes (e.g., OAM modes) may be defined or referred to by a mode index l, where a sign of the mode index l corresponds to a 'handedness' (e.g., left or right) of the helix or helices; and a magnitude of the mode index/(e.g., |l|) corresponds to a quantity of distinct but interleaved helices of the EM wave.

For example, for an EM wave associated with an OAM mode index of l=0, the EM wave is not helical, and the wavefronts of the EM wave are multiple disconnected surfaces (e.g., the EM wave is a sequence of parallel planes). For an EM wave associated with an OAM mode index of l=+1, the EM wave may propagate in a right-handed sense (e.g., the EM wave may form a right helix that rotates about the beam axis in a clockwise direction) and the wavefront of the EM wave may be shaped as a single helical surface with a step length equal to a wavelength/of the EM wave. Likewise, the phase delay over one revolution of the EM wave may be equal to 2π. Similarly, for an OAM mode index of l=−1, the EM wave may propagate in a left-handed sense (e.g., the EM wave may form a left helix that rotates about the beam axis in a counter-clockwise direction) and the wavefront of the EM wave may be also be shaped as a single helical surface with a step length equal to the wavelength λ of the EM wave. Likewise, the phase delay over one revolution of the EM wave may be equal to −2π.

In a further example, for an OAM mode index of l=±2, the EM wave may propagate in either a right-handed sense (if l=+2) or in a left-handed sense (if l=−2) and the wavefront of the EM wave may include two distinct but interleaved helical surfaces. In such examples, the step length of each helical surface may be equal to λ/2. Likewise, the phase delay over one revolution of the EM wave may be equal to +4π. In general terms, a mode-/EM wave may propagate in either a right-handed sense or a left-handed sense (depending on the sign of l) and may include/distinct but interleaved helical surfaces with a step length of each helical surface equal to π/|l|. Likewise, the phase delay over one revolution of the EM wave may be equal to 2/π. In some cases, an EM wave may be indefinitely extended to provide for a theoretically infinite number of degrees of freedom of the OAM of the EM wave (e.g., $l \in \mathbb{Z}$, where $\mathbb{Z}$ is the unbounded set of integers). As such, the OAM of the EM wave may be associated with an infinite number of degrees of freedom.

OAM Modulation

In some examples, the OAM mode index/of an EM wave may correspond to or otherwise function as (e.g., be defined as) an additional dimension for signal or channel multiplexing. For example, each OAM mode or state (of which there may be an infinite number) may function similarly (or equivalently) to a communication channel, such as a subchannel. In other words, an OAM mode or state may correspond to a communication channel, and vice-versa. For instance, a transmitting device or a receiving device may communicate separate signals using EM waves having different OAM modes or states similar to how a transmitting device or receiving device may communicate separate signals over different communication channels. In some aspects, such use of the OAM modes or states of an EM wave to carry different signals may be referred to as the use of OAM beams.

Additionally, in some examples, EM waves with different OAM modes (e.g., OAM states) may be mutually orthogonal to each other (e.g., in a Hilbert sense, in which a space may include an infinite set of axes and sequences may become infinite by way of always having another coordinate direction in which next elements of the sequence can go). Likewise, in a Hilbert sense, orthogonal OAM modes or states may correspond to orthogonal communication channels (e.g., orthogonal sequences transmitted over a communication channel) and, based on the potentially infinite number of OAM modes or states, a wireless communication system employing the use of OAM beams may theoretically achieve infinite capacity. Here, due to the mutual orthogonality among OAM modes, the waveform of one OAM mode generally cannot be received by a receiver aperture configured for a different OAM mode. In theory, an infinite number of OAM states or modes may be twisted together for multiplexing, and the capacity of the OAM link can approach infinity while preserving orthogonality between signals carried by different OAM modes (e.g., indices/). In practice, however, due to non-ideal factors (e.g., Tx/Rx axial and/or position placement error, propagation divergence, and the like), there may be crosstalk among OAM modes at the receiver, and thus a reduced number of concurrent OAM modes may be implemented between wireless devices. In some cases, a transmitting device may generate such OAM beams using uniform circular array (UCA) configurations, such as discussed with reference to FIGS. 6 and 7.

Wireless Communication System

The disclosure that follows presents various concepts that may be implemented across a broad variety of telecommunication systems, network architectures, and communication standards. FIG. 1 illustrates an example of a radio access network (RAN) 100 operating in a wireless communication system that supports one- and/or two-dimensional index modulation in connection with coaxial multi-circle OAM transmissions. By virtue of the wireless communication system 100, the UE 106 may be enabled to carry out data communication with an external data network 110, such as (but not limited to) the Internet.

The RAN 100 may implement any suitable wireless communication technology or technologies to provide radio access to one or more UEs. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, the RAN 100 may operate according to any suitable 6G or other technology, and many other examples may be utilized within the scope of the present disclosure.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. Broadly, a base station is a network element in a RAN responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The geographic area covered by the RAN 100 may be divided into cellular regions (cells) that can be uniquely identified by a user equipment (UE) based on an identification broadcasted from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In the illustrated example, the cells 102, 104, and 126 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints.

It is to be understood that the RAN 100 may include any number of wireless base stations and cells. Further, a relay node may be deployed to extend the size or coverage area of a given cell. The base stations 110, 112, 114, 118 provide wireless access points to a core network for any number of mobile apparatuses.

The RAN 100 supports wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides access to network services. A UE may take on many forms and can include a range of devices.

Within the present document, a "mobile" apparatus (e.g., a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 100 and a UE may be described as utilizing an air interface. The UEs and the base stations may wirelessly communicate with one another via one or more communication links utilizing one or more carriers. The term "carrier" may refer to a set of radio frequency spectrum resources having a defined physical layer structure for supporting the communication links. Transmissions over the air interface from a base station to one or more UEs may be referred to as downlink (DL) transmission. In accordance with certain aspects of the present disclosure, the term downlink may refer to a point-to-multipoint transmission originating at a scheduling entity (e.g., a base station). Another way to describe this scheme may be to use the term broadcast channel multiplexing. Transmissions from a UE to a base station may be referred to as uplink (UL) transmissions. In accordance with further aspects of the present disclosure, the term uplink may refer to a point-to-point transmission originating at a scheduled entity (e.g., a UE).

In general, base stations may include a backhaul interface (not illustrated) for communication with a backhaul portion of the wireless communication system. The backhaul may provide a link between a base station and a core network. Further, in some examples, a backhaul network may provide interconnection between the respective base stations. Various types of backhaul interfaces may be employed, such as a direct physical connection, a virtual network, or the like using any suitable transport network. In some aspects, a portion of a backhaul network may be implemented using OAM transmitters and receivers, each associated with a respective base station and/or portion of the core network.

In some examples, one or more base stations in the RAN 100 may be configured as integrated access and backhaul (IAB) nodes, where the wireless spectrum may be used both for access links (e.g., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks. Additionally or alternatively, OAM transmissions may be leveraged for backhaul communication, which may reduce an impact of wireless backhaul communications on wireless spectrum utilized for communication between the base station and UE when communications with UEs utilizes a different technology.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

Each base station 110, 112, 114, 118, and 120 may be configured to provide an access point to a core network for all the UEs in the respective cells. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120.

In some examples, a mobile network node (e.g., quadcopter 120) may be configured to function as a UE. For example, the quadcopter 120 may operate within the cell 102 by communicating with the base station 110.

In a further aspect of the RAN 100, sidelink signals may be used between UEs without necessarily relying on scheduling or control information from a base station. For example, two or more UEs (e.g., UEs 126 and 128) may communicate with each other using peer to peer (P2P) or sidelink signals 127 without relaying that communication through a base station (e.g., base station 112). In a further example, UE 138 is illustrated communicating with UEs 140 and 142. Here, the UE 138 may function as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138. Thus, in a wireless communication system with scheduled access to time-frequency resources and having a cellular configuration, a P2P configuration, or a mesh configuration, a scheduling entity and one or more scheduled entities may communicate utilizing the scheduled resources.

In some examples, the RAN 100 may operate in a super high frequency (SHF) region (e.g., using frequency bands from 3 GHz to 30 GHz), also known as the centimeter band, in an extremely high frequency (EHF) region of the spectrum (e.g., from 30 GHz to 300 GHz), also known as the millimeter band, or in even higher frequency bands reaching into the terahertz (THz) range. And in some examples, the RAN 100 may support millimeter wave (mmW) communications between the UEs and the base stations, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

Multi-Antenna Arrays Generally

Figure 2:
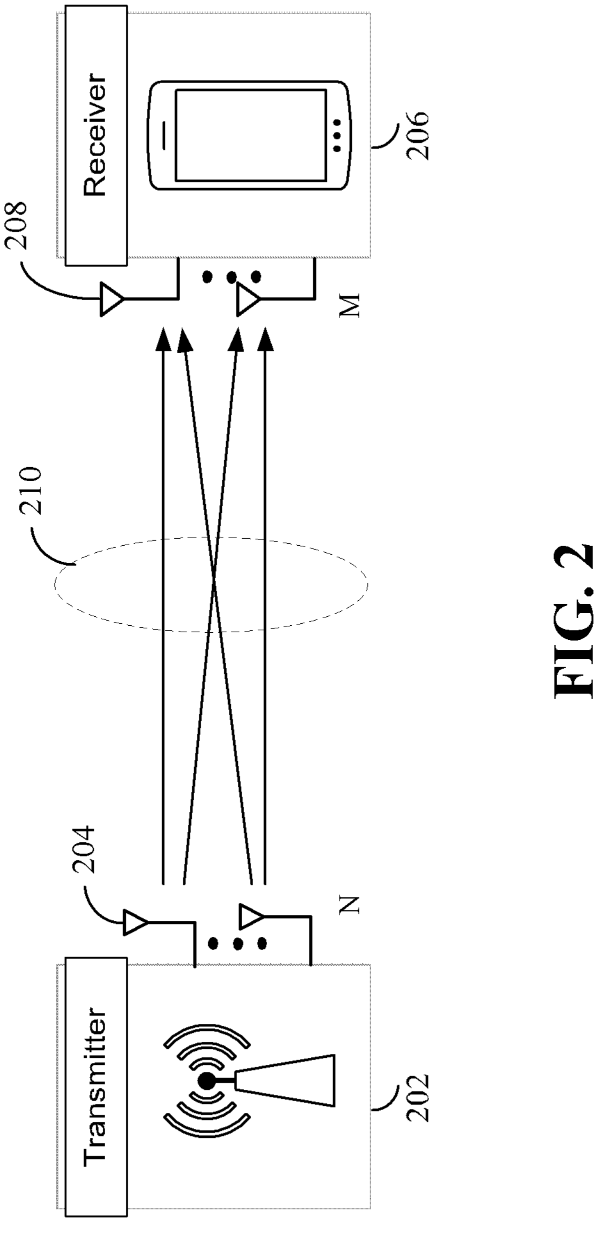
FIG. 2 is a schematic illustration of wireless communication between multi-antenna devices according to some aspects of this disclosure.

In some aspects of the disclosure, a wireless communication node or device may be configured with multiple antennas, e.g., for beamforming, multiple-input multiple-output (MIMO), and/or orbital angular momentum (OAM) modulation technology. FIG. 2 illustrates an example of wireless communication utilizing multiple antennas, supporting beamforming, MIMO, and OAM. In some examples, the system of FIG. 2 may implement aspects of RAN 100. The use of such multiple antenna technology enables a wireless communication system to exploit the spatial domain to support spatial multiplexing, beamforming, and transmit diversity.

Beamforming generally refers to directional signal transmission or reception. For a beamformed transmission, the amplitude and phase of each antenna in an array of antennas may be precoded, or controlled to create a desired (e.g., directional) pattern of constructive and destructive interference in the wavefront. In a MIMO system, a transmitter 202 includes multiple transmit antennas 204 (e.g., N transmit antennas) and a receiver 206 includes multiple receive antennas 208 (e.g., M receive antennas). Thus, there are N×M signal paths 210 from the transmit antennas 204 to the receive antennas 208. Each of the transmitter 202 and the receiver 206 may be implemented, for example, within a scheduling entity 108, a scheduled entity 106, or any other suitable wireless communication device.

In a MIMO system, spatial multiplexing may be used to transmit multiple different streams of data, also referred to as layers, simultaneously on the same time-frequency resource. In some examples, a transmitter may send multiple data streams to a single receiver. In this way, a MIMO system takes advantage of capacity gains and/or increased data rates associated with using multiple antennas in rich scattering environments where channel variations can be tracked. Here, the receiver may track these channel variations and provide corresponding feedback to the transmitter. In the simplest case, a rank-2 (i.e., including 2 data streams) spatial multiplexing transmission on a 2×2 MIMO antenna configuration will transmit two data streams via two transmit antennas 204. The signal from each transmit antenna 204 reaches each receive antenna 208 along a different signal path 210. The receiver 206 may then reconstruct the data streams using the received signals from each receive antenna 208.

The number of data streams or layers in a MIMO system corresponds to the rank of the transmission. In general, the rank of a MIMO system is limited by the number of transmit or receive antennas 204 or 208, whichever is lower. In addition, the channel conditions at the receiving device, as well as other considerations, such as the available resources for use by the transmitting device, may also affect the transmission rank. For example, a base station in a cellular RAN may assign a rank (and therefore, a number of data streams) for a DL transmission to a particular UE based on a rank indicator (RI) the UE transmits to the base station. The UE may determine this RI based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI along with resource information (e.g., the available resources and amount of data to be scheduled for the UE) to assign a DL transmission rank to the UE.

The transmitting device determines the precoding of the transmitted data stream or streams based, e.g., on known channel state information of the channel on which the transmitting device transmits the data stream(s). For example, the transmitting device may transmit one or more suitable reference signals (e.g., a channel state information reference signal, or CSI-RS) that the receiving device may measure. The receiver may then report measured channel quality information (CQI) back to the transmitting device. This CQI generally reports the current communication channel quality, and in some examples, a requested transport block size (TBS) for future transmissions to the receiver. In some examples, the receiver may further report a precoding matrix indicator (PMI) back to the transmitting device. This PMI generally reports the receiving device's preferred precoding matrix for the transmitting device to use, and may be indexed to a predefined codebook. The transmitting device may then utilize this CQI/PMI to determine a suitable precoding matrix for transmissions to the receiver.

In some cases, the RAN 100 may be an example of or otherwise support an OAM-based communication system and a transmitting device 202 and/or a receiving device 206 may communicate via OAM beams. In some examples, the transmitting device 202 and/or the receiving device 206 may generate and steer an OAM beam based on selecting a set of antenna elements from a planar array of antenna elements (e.g., a planar array on the transmitting device 202 or a receiving device 206 that may be used for MIMO communications) based on which antenna elements fall within a determined area on the planar array associated with a uniform circular array (UCA) for OAM communications. Additionally or alternatively, one or more transmitting devices 202 or receiving 206 may include components that provide for spiral phase plate (SPP)-based OAM communications.

In various examples, some or all of the wireless resources of the RAN 100 may be scheduled to carry one or more physical channels, including control channels, shared channels, data channels, etc. Other resources of the RAN 100 may also carry pilots or reference signals. These pilots or reference signals may provide for a receiving device to perform channel estimation of the corresponding channel.

In a DL transmission, the transmitting device (e.g., a base station or scheduling entity) may allocate a set of wireless resources to carry DL control information including one or more DL control channels that generally carry information originating from higher layers to one or more receiving devices (e.g., a UE or scheduled entity). In addition, DL resources may be allocated to carry DL physical signals that generally do not carry information originating from higher layers. These DL physical signals may include synchronization signals, demodulation reference signals (DM-RS), phase-tracking reference signals (PT-RS), channel-state information reference signals (CSI-RS), etc.

In an UL transmission, a transmitting device (e.g., a UE or scheduled entity) may utilize a set of designated wireless resources to carry UL control information (UCI) to a receiving device (e.g., a base station or scheduling entity). The UCI can originate from higher layers via one or more UL control channels. Further, UL wireless resources may carry UL physical signals that generally do not carry information originating from higher layers, such as demodulation reference signals (DM-RS), phase-tracking reference signals (PT-RS), sounding reference signals (SRS), etc.

In a sidelink (SL) transmission, a transmitting device (e.g., a UE or scheduled entity, or a base station of scheduling entity) may utilize a set of designated wireless resources to carry SL control information (SCI) to a receiving device (e.g., another UE or scheduled entity, or another base station of scheduling entity). Further, SL wireless resources may carry SL physical signals that generally do not carry information originating from higher layers, such as demodulation reference signals (DM-RS), phase-tracking reference signals (PT-RS), sounding reference signals (SRS), etc.

In addition to control information, wireless resources may be allocated for user data or traffic data, which may be carried on one or more traffic channels.

Wireless Resources

Those of ordinary skill in the art will understand that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. And further, each frame may consist of a set of subframes (e.g., 10 subframes of 1 ms each). A given carrier may include one set of frames in the UL, and another set of frames in the DL.

A resource grid may represent time-frequency resources for a given antenna port. For example, in a MIMO implementation with multiple antenna ports available, a corresponding multiple number of resource grids may be available for communication. As another example, as described below, different OAM modes may be orthogonal when transmitted using the same time, frequency, and/or code resources, and thus may be associated with independent resource grids.

A resource grid may be divided into multiple resource elements (REs). An RE, which is 1 subcarrier×1 symbol, is the smallest discrete part of the time-frequency grid, and may contain a single complex value representing data from a physical channel or signal. Depending on the modulation utilized in a particular implementation, each RE may represent one or more bits of information. In some examples, a block of REs may be referred to as a physical resource block (PRB) or more simply a resource block (RB), which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. The present disclosure assumes, by way of example, that a single RB entirely corresponds to a single direction of communication (either transmission or reception for a given device).

A UE generally utilizes only a subset of a resource grid. An RB may be the smallest unit of resources that a scheduler can allocate to a UE. Thus, the more RBs scheduled for a UE, and the higher the modulation scheme chosen for the air interface, the higher the data rate for the UE. While a UE may use only a subset of a resource grid (e.g., to permit other UEs to also communicate using the RAN), an OAM transmitter and OAM receiver may utilize a much greater portion of the resource grid associated with one or more OAM modes. For example, there may not be other devices configured to use the same resources as there often are when utilizing mobile resources in a RAN. An OAM transmitter and receiver pair are generally closely spatially aligned, potentially reducing the ability to use the antennas to communicate with other devices that are not closely aligned.

A resource used to transmit and/or receive a signal (e.g., a waveform) may include time-frequency resources, such as one or more REs, one or more RBs, etc., within a particular resource grid. Additionally or alternatively, a resource may include a layer (e.g., the physical layer, a media access control (MAC) layer, a radio resource control (RRC) layer, etc.), a code (e.g., used to implement a code-division multiple access scheme), an OAM mode, an array of antenna elements (e.g., a UCA circle, a portion of a ULA, a portion of a UPA, etc.).

Description of Channels and Signals

Various REs within an RB may carry one or more physical channels, including control channels, shared channels, data channels, etc. Other REs within the RB may also carry pilots or reference signals. These pilots or reference signals may provide for a receiving device to perform channel estimation of the corresponding channel, which may enable coherent demodulation/detection of the control and/or data channels within the RB.

In a DL transmission, the transmitting device (e.g., a base station or a UE) may allocate one or more REs (e.g., within a control region) to carry one or more DL control channels. These DL control channels include DL control information (DCI) that generally carries information originating from higher layers, such as a physical broadcast channel (PBCH), a physical downlink control channel (PDCCH), etc., to one or more receiving devices (e.g., a UE). In addition, the transmitting device may allocate one or more DL REs to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

A base station (or other suitable transmitter device) may transmit the synchronization signals PSS and SSS (collectively referred to as SS), and in some examples, the PBCH, in a synchronization signal block (SSB) that includes 4 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize nonconsecutive symbols for an SSB, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity) may utilize one or more REs to carry one or more UL control channels, such as a physical uplink control channel (PUCCH), a physical random access channel (PRACH), etc. These UL control channels include UL control information (UCI) that generally carries information originating from higher layers. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information may include a scheduling request (SR), i.e., a request for the scheduling entity to schedule uplink transmissions. Here, in response to the SR transmitted on the control channel, the scheduling entity may transmit downlink control information that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein a receiving device can check the integrity of packet transmissions for accuracy, e.g., utilizing any suitable integrity checking mechanism, such as a checksum or a cyclic redundancy check (CRC). If the receiving device confirms the integrity of the transmission, it may transmit an ACK, whereas if not confirmed, it may transmit a NACK. In response to a NACK, the transmitting device may send a HARQ retransmission, which may implement chase combining, incremental redundancy, etc.

In addition to control information, one or more REs may be allocated for user data or traffic data. Such traffic may be carried on one or more traffic channels, such as, for a DL transmission, a physical downlink shared channel (PDSCH); or for an UL transmission, a physical uplink shared channel (PUSCH).

The channels or carriers described above are not necessarily all the channels or carriers that may be utilized between a scheduling entity and one or more scheduled entities, and those of ordinary skill in the art will recognize that other channels or carriers may be utilized in addition to those illustrated, such as other traffic, control, and feedback channels.

Block Diagrams

Figure 3:
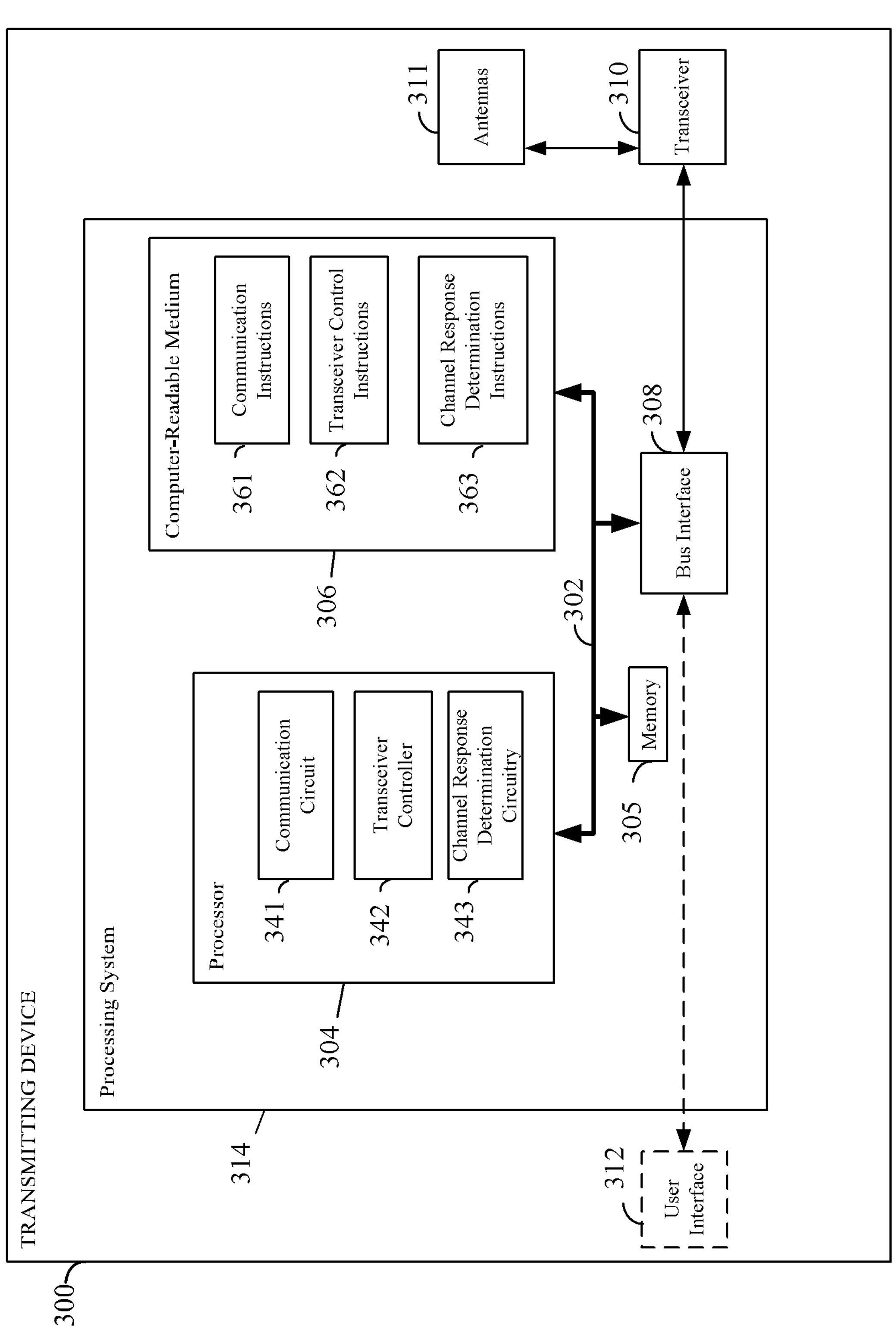
FIG. 3 is a block diagram conceptually illustrating an example of a hardware implementation for a transmitting device according to some aspects of the disclosure.

FIG. 3 is a block diagram illustrating an example of a hardware implementation for a transmitting device 300 employing a processing system 314. For example, the transmitting device 300 may be a user equipment (UE), a base station, or any other wireless communication node, e.g., as illustrated in any of FIGS. 1 and/or 2.

The transmitting device 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), application specific integrated circuits (ASICs), state machines, gated logic, discrete hardware circuits, and other suitable hardware configured to perform the various functionality described throughout this disclosure. In various examples, the transmitting device 300 may be configured to perform any one or more of the functions described herein. That is, the processor 304, as utilized in a transmitting device 300, may be configured (e.g., in coordination with the memory 305) to implement any one or more of the processes and procedures described below and illustrated in FIGS. 7-10.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310.

The transceiver 310 provides a communication interface or means for communicating with various other apparatus over a transmission medium. In some aspects, the transceiver 310 includes (or is coupled to) a plurality of antennas 311 (e.g., which may each include multiple antenna elements). The plurality of antennas 311 may be configured similar to the uniform circular array (UCA) antennas described below and illustrated in FIG. 5; similar to the coaxial multi-circle UCA configuration described below and illustrated in FIG. 6; or some combination of the above. In some aspects, any structures that enable OAM multiplexing of electromagnetic signals (e.g., RF signals, light signals, etc.) may apply, including but not limited to UCA antennas, which are described as examples. The plurality of antennas 311 may include or otherwise be configured using any other suitably configured phase plates, spatial modulators, integrated circuits, any other suitable components, and/or any suitable combination thereof, for transmission over any suitable medium including a wireless air interface, an optical fiber, etc. In some aspects, the transceiver 310 may be configured to provide any suitable number of simultaneous signals to the antennas 311. For example, the transceiver may be configured to implement multiple transceiver units (sometimes referred to as TXRUs) that may each transmit a signal (e.g., corresponding to a particular OAM mode) via a subset of antennas (e.g., corresponding to a particular uniform circular array (UCA), as described below in connection with FIGS. 5 and 6). Additionally, in some aspects, such TXRUs may be configured to receive a signal (e.g., corresponding to a particular OAM mode) via a subset of antennas (e.g., corresponding to a particular uniform circular array (UCA), as described below in connection with FIGS. 5 and 6). As described below in connection with FIG. 7, the number of OAM modes that a UCA can transmit and/or receive simultaneously may be limited based on the number of TXRUs associated with the UCA. For example, a particular UCA may be configured to simultaneously transmit and/or receive any two OAM modes (e.g., mode 1 and 2, mode 1 and 3, etc.).

Depending upon the nature of the transmitting device 300, a user interface 312 (e.g., keypad, display, speaker, microphone, joystick) may also be provided. Of course, such a user interface 312 is optional, and may be omitted in some examples, such as a base station.

In some aspects of the disclosure, the processor 304 may include communication circuitry 341 configured (e.g., in coordination with the memory 305) for various functions, including, e.g., coordinating with a transceiver controller circuit 342 and/or transceiver controller instructions 362 to transmit suitable waveform to communicate information and/or transmit reference signals using one or more OAM modes. For example, the communication circuitry 341 may be configured to implement one or more of the functions described below in relation to FIG. 7, including, e.g., blocks 702, 710, and/or 722; in relation to FIG. 8, including, e.g., blocks 802, 804, and/or 806; in relation to FIG. 10, including, e.g., blocks 1010, 1014, 1016, 1018, and/or 1020.

In some further aspects of the disclosure, the processor 304 may include a transceiver controller 342 configured (e.g., in coordination with the memory 305 and/or the transceiver 310) for various functions, including, e.g., transmitting a suitable waveform (e.g., information or data stream) and/or reference signal (e.g., DM-RS, CSI-RS, etc.) as disclosed herein. For example, the transceiver controller 342 may be configured to implement one or more of the functions described below in relation to FIG. 7, including, e.g., blocks 702, 710, and/or 722; in relation to FIG. 8, including, e.g., blocks 802, 804, and/or 806; in relation to FIG. 10, including, e.g., blocks 1010, 1014, 1016, 1018, and/or 1020.

In some further aspects of the disclosure, the processor 304 may include channel response determination circuitry 343 configured (e.g., in coordination with the memory 305) for various functions, including, e.g., determining a channel response for a particular OAM mode and a particular pair of transmitting UCA and receiving UCA, determining precoding weights for a particular OAM mode based on information about UCA circles. In some examples, the channel response determination circuitry 343 may determine a channel response for a particular OAM mode based on the radius of a UCA used to receive a reference signal, a radius of a UCA used to transmit the reference signal, a distance between the transmitting UCA and the receiving UCA, and a wavelength used to transmit the reference signal; in some additional examples, the channel response determination circuitry 343 may determine precoding weights for a particular OAM mode based on a channel response matrix associated with the particular OAM mode and one or more pairs of transmitting and receiving UCAs. For example, the channel response determination circuitry 343 may be configured to implement one or more of the functions described below in relation to FIG. 7, including, e.g., block 724.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 306 may store computer-executable code that includes communication instructions 361 that configure a transmitting device 300 for various functions, including, e.g., receiving an information stream (e.g., a sequence of bits) for transmission, and coordinating with a transceiver controller circuit 342 and/or transceiver controller instructions 362 to transmit a suitable waveform. For example, the communication instructions 361 may be configured to cause a transmitting device 300 to implement one or more of the functions described below in relation to FIG. 7, including, e.g., blocks 702, 710, and/or 722; in relation to FIG. 8, including, e.g., blocks 802, 804, and/or 806; in relation to FIG. 10, including, e.g., blocks 1010, 1014, 1016, 1018, and/or 1020.

In one or more further examples, the computer-readable storage medium 306 may store computer-executable code that includes transceiver controller instructions 362 that configure a transmitting device 300 for various functions, including, e.g., transmitting a suitable waveform (e.g., information or data stream) and/or reference signal (e.g., DM-RS, CSI-RS, etc.) as disclosed herein. For example, the transceiver controller instructions 362 may be configured to cause a transmitting device 300 to implement one or more of the functions described below in relation to FIG. 7, including, e.g., blocks 702, 710, and/or 722; in relation to FIG. 8, including, e.g., blocks 802, 804, and/or 806; in relation to FIG. 10, including, e.g., blocks 1010, 1014, 1016, 1018, and/or 1020.

In one or more further examples, the computer-readable storage medium 306 may store computer-executable code that includes channel response determination instructions 363 that configure a transmitting device 300 for various functions, including, e.g., determining a channel response for a particular OAM mode and a particular pair of transmitting UCA and receiving UCA, determining precoding weights for a particular OAM mode based on information about UCA circles. In some examples, the channel response determination instructions 363 may determine a channel response for a particular OAM mode based on the radius of a UCA used to receive a reference signal, a radius of a UCA used to transmit the reference signal, a distance between the transmitting UCA and the receiving UCA, and a wavelength used to transmit the reference signal; in some additional examples, the channel response determination instructions 363 may determine precoding weights for a particular OAM mode based on a channel response matrix associated with the particular OAM mode and one or more pairs of transmitting and receiving UCAs. For example, the channel response determination instructions 363 may be configured to implement one or more of the functions described below in relation to FIG. 7, including, e.g., blocks 724.

In one configuration, the transmitting device 300 for wireless communication includes means for transmitting a reference signal (e.g., a first reference signal, a second reference signal, etc.) using a particular orbital angular momentum (OAM) mode (e.g., a first OAM mode, a second OAM mode, etc.); means for receiving information indicative of a subset of antenna elements of the plurality of antenna elements to use to transmit the first OAM mode, means for transmitting reference signal configuration information that indicates that a first subset of reference signals of a plurality of reference signals are associated with the first OAM mode; means for receiving, from the receiving apparatus, at least one of: a rank indicator associated with the first OAM mode, or channel quality information associated with the first OAM mode; means for determining a channel response for a particular OAM mode based on a radius of a first UCA used to transmit a reference signal, a radius of a third UCA used by a receiving apparatus to receive the reference signal, a distance between the first UCA and the third UCA, and a wavelength of a waveform used to transmit first reference signal; and/or means for determining another channel response for the particular OAM mode based on a radius of a second UCA used to transmit another reference signal, the radius of the third UCA, a distance between the first UCA and the third UCA, and the wavelength of the waveform used to transmit first reference signal. In one aspect, the aforementioned means may be the processor 304 shown in FIG. 3 configured to perform the functions recited by the aforementioned means. In another aspect, the aforementioned means may be a circuit or any apparatus configured to perform the functions recited by the aforementioned means.

Figure 5:
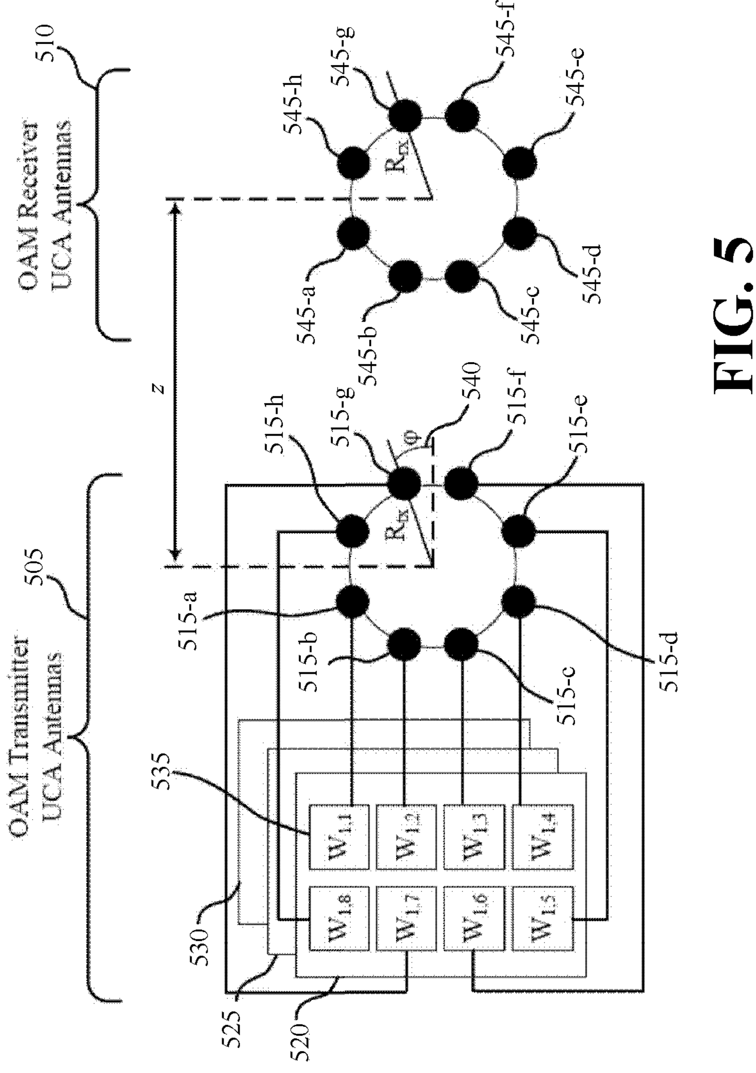
FIG. 5 is a schematic illustration of wireless communication via a uniform circular array (UCA) configuration that supports the use of orbital angular momentum (OAM) modes for multiplexing communications in accordance with some aspects of this disclosure.
Figure 7:
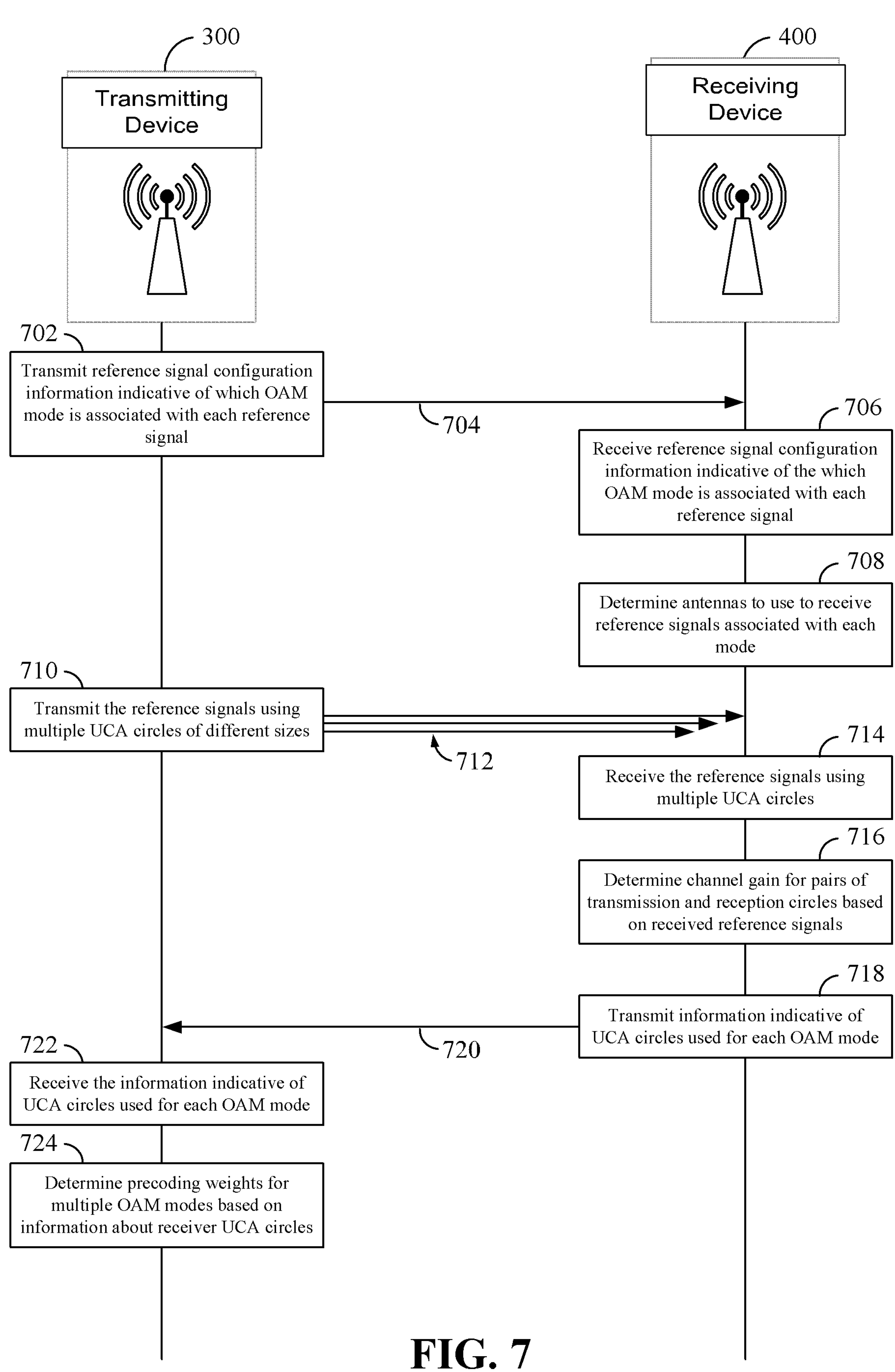
FIG. 7 is a call flow diagram illustrating an exemplary process for determining inter-circle precoding weights for an OAM communication system in accordance with some aspects of this disclosure.
Figure 8:
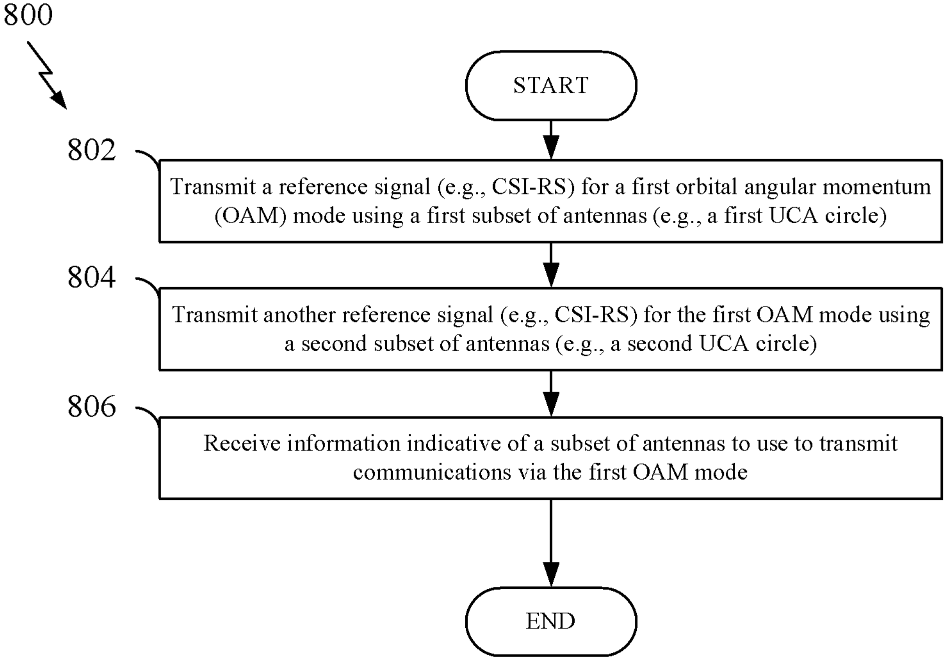
FIG. 8 is a flow chart illustrating an exemplary process for an OAM transmitting device to determine inter-circle precoding weights for an OAM communication system in accordance with some aspects of this disclosure.

Of course, in the above examples, the circuitry included in the processor 304 is merely provided as an example, and other means for carrying out the described functions may be included within various aspects of the present disclosure, including but not limited to the instructions stored in the computer-readable storage medium 306, or any other suitable apparatus or means described in any one of the FIGS. 1, 2, 5, and/or 6, and utilizing, for example, the processes and/or algorithms described herein in relation to FIGS. 7, 8, and/or 10.

Figure 4:
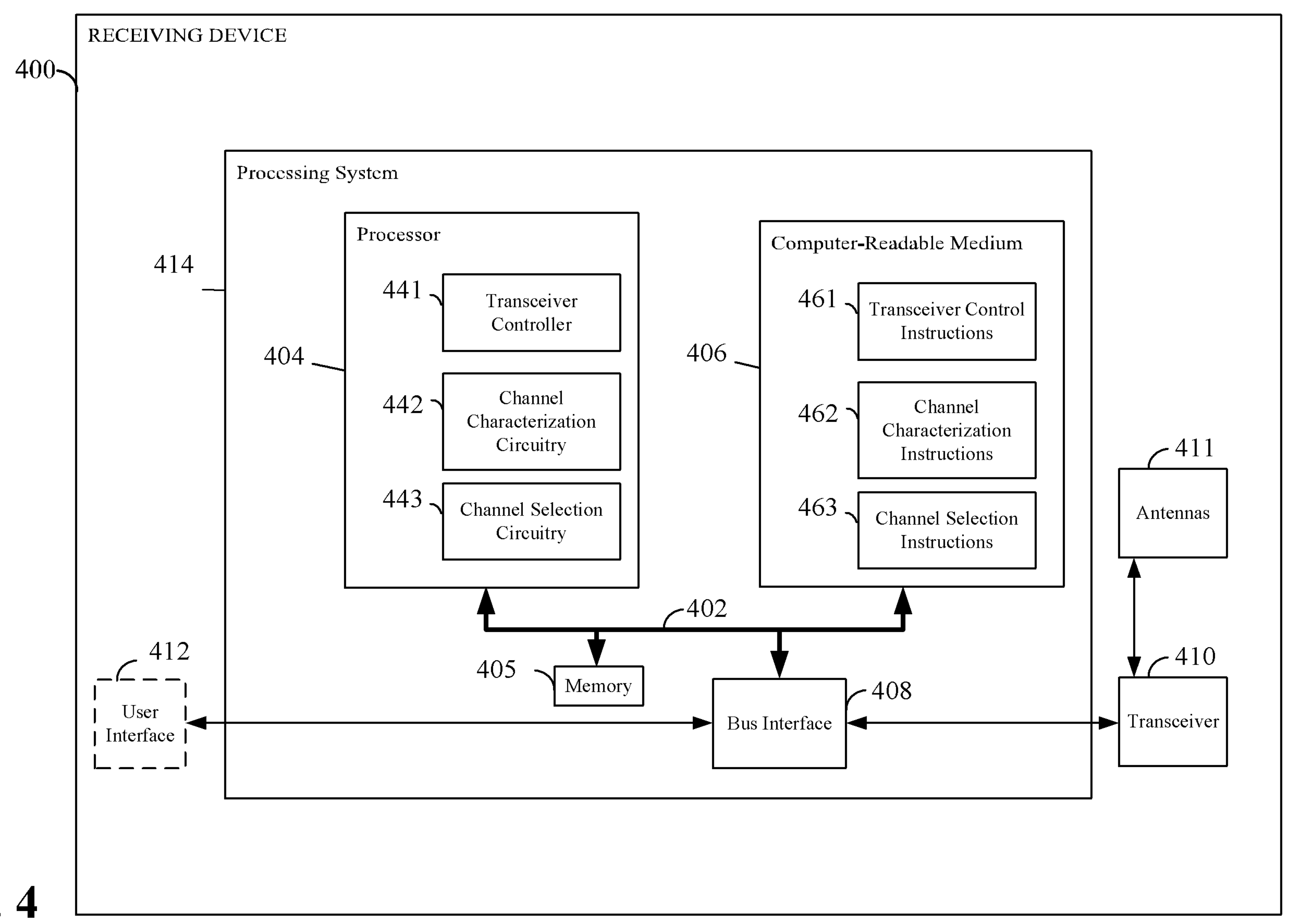
FIG. 4 is a block diagram conceptually illustrating an example of a hardware implementation for a receiving device according to some aspects of the disclosure.

FIG. 4 is a conceptual diagram illustrating an example of a hardware implementation for an exemplary receiving device 400 employing a processing system 414. In accordance with various aspects of the disclosure, an element, or any portion of an element, or any combination of elements may be implemented with a processing system 414 that includes one or more processors 404. For example, the receiving device 400 may be a user equipment (UE), a base station, or any other suitable wireless communication node, e.g., as illustrated in any of FIGS. 1 and/or 2.

In some aspects, the transceiver 410 includes (or is coupled to) a plurality of antennas 411 (e.g., which may each include multiple antenna elements). The plurality of antennas 411 may be configured similar to the uniform circular array (UCA) antennas described below and illustrated in FIG. 5; similar to the coaxial multi-circle UCA configuration described below and illustrated in FIG. 6; or some combination of two or more of the above. In some aspects, any structures that enable OAM multiplexing of electromagnetic signals (e.g., RF signals, light signals, etc.) may apply, including but not limited to UCA antennas, which are described as examples. The plurality of antennas 411 may include or otherwise be configured using any other suitably configured phase plates, spatial modulators, integrated circuits, any other suitable components, and/or any suitable combination thereof, for transmission over any suitable medium including a wireless air interface, an optical fiber, etc.

The processing system 414 may be substantially the same as the processing system 314 illustrated in FIG. 3, including a bus interface 408, a bus 402, memory 405, a processor 404, and a computer-readable medium 406. Furthermore, the receiving device 400 may include a user interface 412, and a transceiver 410 substantially similar to those described above in FIG. 3. That is, the processor 404, as utilized in a receiving device 400, may be configured (e.g., in coordination with the memory 405) to implement any one or more of the processes described below and illustrated in FIGS. 7, 9, and/or 10.

In some aspects of the disclosure, the processor 404 may include a transceiver controller 441 configured (e.g., in coordination with the memory 405) for various functions, including, for example, receiving and sampling a waveform (in some examples, including one or more reference signals), and storing samples of the received waveform in memory 405. For example, the transceiver controller 441 may be configured to implement one or more of the functions described below in relation to FIG. 7, including, e.g., blocks 706, 714, and/or 718; in relation to FIG. 9, including, e.g., blocks 902, 904, and/or 906; and/or in relation to FIG. 10, including, e.g., blocks 1010, 1014, 1016, 1018, and/or 1020.

In some further aspects of the disclosure, the processor 404 may include channel characterization circuitry 442 configured (e.g., in coordination with the memory 405) for various functions, including, for example, measuring a channel based on a reference signal received using a particular OAM mode, and determining a channel gain between a UCA used to transmit the reference signal using the particular OAM mode and a UCA used to receive the reference signal using the particular OAM mode. In some examples, the channel characterization circuitry 442 may measure a channel based on a received reference signal (e.g., a received CSI-RS) that was transmitted and received using a particular OAM mode; and in some other examples, the channel characterization circuitry 442 may determine a channel gain between a UCA antenna that transmitted a reference signal (e.g., a CSI-RS) using a particular OAM mode and a UCA antenna that received the reference signal. For example, the channel characterization circuitry circuitry 442 may be configured to implement one or more of the functions described below in relation to FIG. 7, including, e.g., block 716.

In some further aspects of the disclosure, the processor 404 may include channel selection circuitry 443 configured (e.g., in coordination with the memory 405) for various functions, including, for example, determining antennas (e.g., UCA antennas) to use to receive reference signals associated with various OAM modes, and selecting an antenna(s) (e.g., a UCA antenna) to be used to by a transmitting device (e.g., the transmitting device 300) to transmit a particular OAM mode. In some examples, the channel selection circuitry 443 may determine antennas to use to receive reference signals (e.g., CSI-RS) associated with each OAM mode based on any suitable information (e.g., a maximum number of simultaneous OAM modes each transmitter UCA is configured to transmit, a maximum number of simultaneous OAM modes each receiver UCA is configured to receive, etc.); and in some other examples, the channel selection circuitry 443 may select transmitter UCAs to use to transmit each OAM mode and/or allocate receiver UCAs to receive each OAM mode based on channel gains between one or more pairs of UCAs used to transmit and receive each OAM mode. For example, the channel selection circuitry 443 may be configured to implement one or more of the functions described below in relation to FIG. 7, including, e.g., blocks 708 and/or 716.

And further, the computer-readable storage medium 406 may store computer-executable code that includes transceiver controller instructions 461 that configure a receiving device 400 for various functions, including, e.g., receiving and sampling a waveform (in some examples, including one or more reference signals), and storing samples of the received waveform in memory 405. For example, the transceiver controller instructions 461 may be configured to cause a receiving device 400 to implement one or more of the functions described below in relation to FIG. 7, including, e.g., blocks 706, 714, and/or 718; in relation to FIG. 9, including, e.g., blocks 902, 904, and/or 906; and/or in relation to FIG. 10, including, e.g., blocks 1010, 1014, 1016, 1018, and/or 1020.

In some further examples, the computer-readable storage medium 406 may store computer-executable code that includes channel characterization instructions 462 that configure a receiving device 400 for various functions, including, e.g., measuring a channel based on a reference signal received using a particular OAM mode, and determining a channel gain between a UCA used to transmit the reference signal using the particular OAM mode and a UCA used to receive the reference signal using the particular OAM mode. In some examples, the channel characterization instructions 462 may measure a channel based on a received reference signal (e.g., a received CSI-RS) that was transmitted and received using a particular OAM mode; and in some other examples, the channel characterization instructions 462 may determine a channel gain between a UCA antenna that transmitted a reference signal (e.g., a CSI-RS) using a particular OAM mode and a UCA antenna that received the reference signal. For example, the channel characterization instructions 462 may be configured to implement one or more of the functions described below in relation to FIG. 7, including, e.g., block 716.

In some further examples, the computer-readable storage medium 406 may store computer-executable code that includes channel selection instructions 463 that configure a receiving device 400 for various functions, including, e.g., determining antennas (e.g., UCA antennas) to use to receive reference signals associated with various OAM modes, and selecting an antenna(s) (e.g., a UCA antenna) to be used to by a transmitting device (e.g., the transmitting device 300) to transmit a particular OAM mode. In some examples, the channel selection instructions 463 may determine antennas to use to receive reference signals (e.g., CSI-RS) associated with each OAM mode based on any suitable information (e.g., a maximum number of simultaneous OAM modes each transmitter UCA is configured to transmit, a maximum number of simultaneous OAM modes each receiver UCA is configured to receive, etc.); and in some other examples, the channel selection instructions 463 may select transmitter UCAs to use to transmit each OAM mode and/or allocate receiver UCAs to receive each OAM mode based on channel gains between one or more pairs of UCAs used to transmit and receive each OAM mode. For example, the channel selection instructions 463 may be configured to implement one or more of the functions described below in relation to FIG. 7, including, e.g., blocks 708 and/or 716.

In one configuration, the receiving device 400 for wireless communication includes means for receiving, from a transmitting device (e.g., the transmitting device 300), an indication that a particular subset of antenna elements (e.g., corresponding to a particular UCA circle) are to be used to transmit a first reference signal for a first OAM mode; means for receiving, from a transmitting device (e.g., the transmitting device 300), an indication that a particular subset of antenna elements (e.g., corresponding to a particular UCA circle) are to be used to transmit a second reference signal for a first OAM mode; means for transmitting information indicative of a subset of antenna elements of that was used to receive the first reference signal; means for receiving the first reference signal; means for receiving the second reference signal; means for receiving, from a transmitting device (e.g., the transmitting device 300), reference signal configuration information; means for determining, based on the reference signal configuration information, that the first reference signal is to be transmitted using a first UCA; means for measuring a channel based on the first reference signal; means for determining a first channel gain between the first UCA and a UCA used to receive the first reference signal; means for determining a second channel gain between the first UCA and a UCA used to receive the second reference signal; means for receiving information indicative of a maximum number of OAM modes that a transmitting device is configured to simultaneously transmit using a first UCA; means for selecting a UCA to be used to transmit using the first OAM mode based on the first channel gain, the second channel gain, and the maximum number of OAM modes that the transmitting apparatus is configured to simultaneously transmit using the first UCA; and/or means for transmitting information indicative of a subset of antenna elements (e.g., a UCA) of a transmitting device (e.g., the transmitting device 300) to transmit the first OAM mode. In one aspect, the aforementioned means may be the processor 404 shown in FIG. 4 configured to perform the functions recited by the aforementioned means. In another aspect, the aforementioned means may be a circuit or any apparatus configured to perform the functions recited by the aforementioned means.

Figure 9:
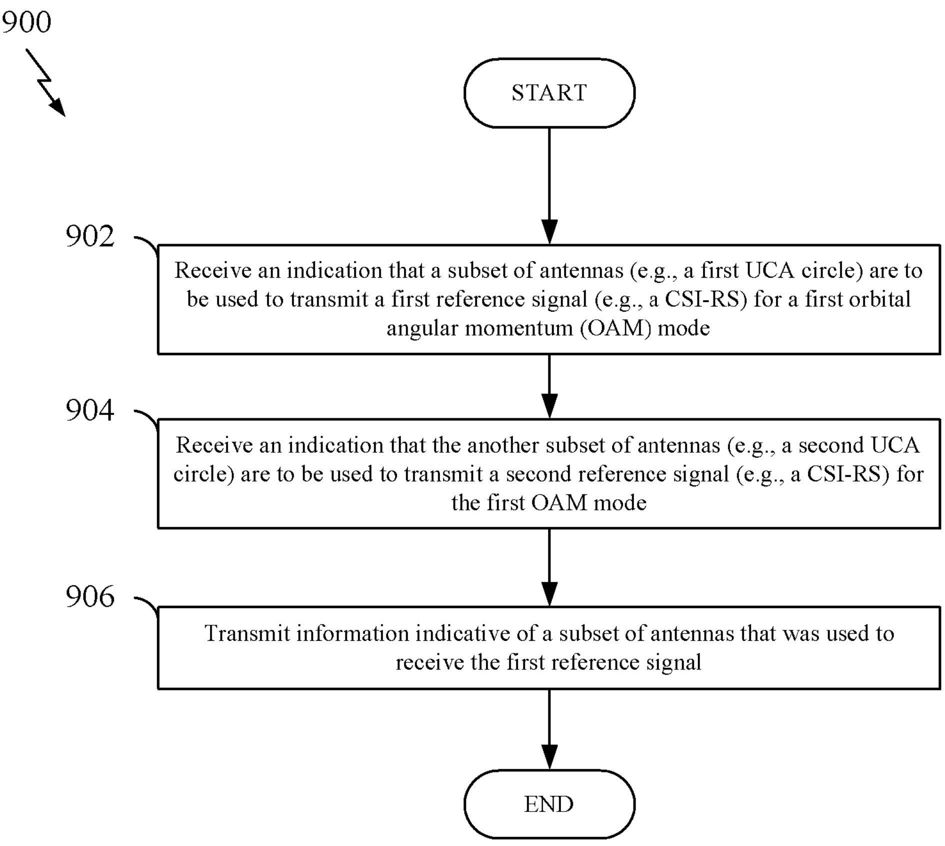
FIG. 9. is a flow chart illustrating an exemplary process for an OAM receiving device to determine information for a transmitting device to determine inter-circle precoding weights for an OAM communication system in accordance with some aspects of this disclosure.

Of course, in the above examples, the circuitry included in the processor 404 is merely provided as an example, and other means for carrying out the described functions may be included within various aspects of the present disclosure, including but not limited to the instructions stored in the computer-readable storage medium 406, or any other suitable FIGS. 1, 2, 5, and/or 6, and utilizing, for example, the processes and/or algorithms described herein in relation to FIGS. 7, 9, and/or 10.

In some aspects, this disclosure provides for a wireless communication technique that exploits an orbital angular momentum (OAM) property of electromagnetic (EM) waves for modulating a carrier to carry information, and/or for multiplexing reference signals onto a common wireless resource. Systems and devices that employ OAM are currently under intense development due to its improved communication spectrum efficiency, its capability to provide high-order spatial multiplexing (e.g., as described further below), potentially resulting in higher data rates, and the possibility to enable low receiver complexity, OAM is regarded as a strong candidate for future 6G communication technology or as an enhancement to existing 5G technology.

UCA Configuration

FIG. 5 illustrates an example of a uniform circular array (UCA) OAM configuration that supports information transmission by OAM mode selection and detection in accordance with some aspects of the present disclosure. In some examples, the illustrated UCA OAM configuration may implement aspects of RAN 100, and may be employed by the transmitting device 202/300 and receiving device 206/400. In this example, a transmitting device (e.g., UE or base station) may include OAM transmitter UCA antennas 505 and a receiving device (e.g., UE or base station) may include OAM receiver UCA antennas 510.

In some aspects, one or both of the OAM transmitter UCA antennas 505 or the OAM receiver UCA antennas 510 may be implemented as a planar array of antenna elements, which may be an example of or otherwise function as a (massive or holographic) MIMO array or an intelligent surface. In some cases, the transmitting device may identify a set of antenna elements 515 of the planar array that form a transmitter UCA, and a receiving device may identify a set of antenna elements 545 of the planar array that form a receiver UCA.

Upon selecting the set of antenna elements from the planar array, the OAM transmitter may apply a weight 535 to each of the selected antenna elements 515 based on the OAM mode index l of the transmitted OAM beam and one or more spatial parameters associated with each antenna element. In cases in which a UCA methodology is used to generate an OAM beam, the transmitting device may identify the set of antenna elements 515 on a circular array of antenna elements and may load a first set of weights 520 to each of the identified antenna elements based on a first OAM mode index (e.g., l=0). Further, for other OAM mode indices, other weights may be used for the set of antenna elements 515, such as a second OAM mode index (e.g., l=+1) that may use a second set of weights 525 and a third OAM mode index (e.g., l=−1) that may use a third set of weights 530.

For example, to generate an OAM beam with a selected OAM mode index (e.g., l=0), an OAM transmitter may load a weight 535 to each antenna element 515 on the UCA based on an angle 540 measured between a reference line on the UCA (e.g., the x-axis of the plane on which the UCA is located, where the origin is at the center of the UCA) and the antenna element, the OAM mode index l, and i (e.g., for complex-valued weights, which may alternatively be denoted as j in some cases). In some cases, for instance, the weight for an antenna element n may be proportional to eilon, where on is equal to the angle 540 measured between the reference line on the UCA and the antenna element n. By multiplying respective beamforming weights 535 of each set of weights 520-530 (e.g., for first set of weights 520, $w_1=[w_{1,1}, w_{1,2}, \ldots, w_{1,8}]^7$) onto each antenna, a signal port may be generated. If the weight 535 of each antenna element 515 is equal to $e^{i\varphi l}$, where φ is the angle of antenna element 515 in the circle (e.g., angle 540 for antenna element 515-*g*), and l is the OAM mode index, then each set of weights 520-530 provides a beamformed port that is equivalent OAM mode l. By using different beamforming weights $e^{i\varphi l'}$, where l'≠l, multiple OAM modes are thus generated.

At the OAM receiver UCA antennas 510, the receiving device may have receive antenna elements 545 equipped in a circle. The channel matrix may be denoted from each transmit antenna to each receive antenna as H, and then for the beamformed channel matrix $\tilde{H}=H[w_1, w_2, \ldots, w_L]$, any two columns of $\tilde{H}$ are orthogonal, which means the beamformed ports have no crosstalk. This may allow OAM-based communication to efficiently realize a high-level spatial multiplexing degree. Further, the eigen-based transmit precoding weights and receive combining weights of UCA-based OAM are equal to a discrete Fourier transform (DFT) matrix, which is independent of communication parameters (e.g., distance, aperture size, and carrier frequency). Thus, UCA-based OAM may be implemented at relatively low cost. In some cases, the receiving device may test multiple different OAM modes to determine the OAM mode that was used in a transmission (e.g., based on whether a particular OAM mode yields a successfully demodulated transmission), which may be used to identify one or more information bits of a transmission.

In some aspects, when the central axes of the transmitter antennas (e.g., the antennas 311) and receiver antennas (e.g., the antennas 411) are closely aligned (e.g., with less than 0.1 milliradians (mrad) of misalignment), each OAM mode is orthogonal to each other OAM mode. However, as the antennas become misaligned, neighboring OAM modes may cause interference. For example, at 1 mrad of misalignment, an adjacent OAM mode may cause significant interference, and at larger misalignments, OAM modes that are father from a particular OAM mode may also cause interference.

Multiple Coaxial UCA Configuration

Figure 6:
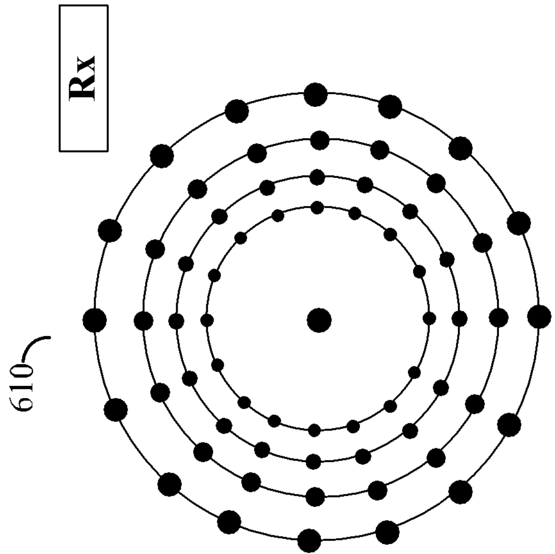
FIG. 6 is a schematic illustration of a coaxial multi-circle OAM configuration that supports two-dimensional index modulation according to some aspects of this disclosure.
Figure 6:
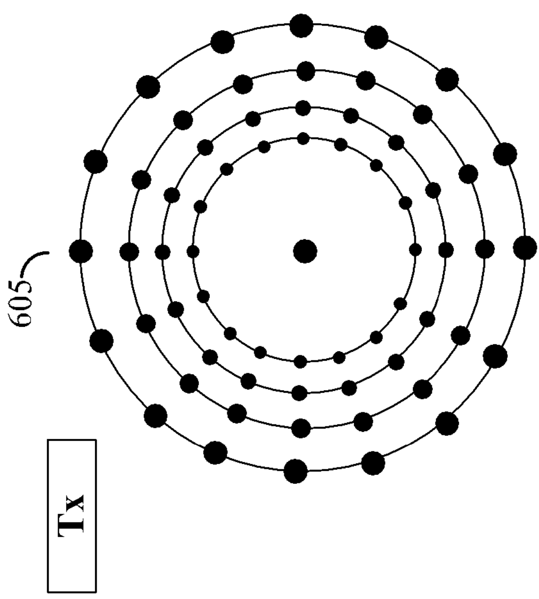

FIG. 6 illustrates an example of a coaxial multi-circle UCA OAM configuration that supports multiplexing and modulating wireless transmissions by controlling OAM modes and coaxial UCA circles in accordance with some aspects of the present disclosure. In some examples, the illustrated coaxial multi-circle UCA OAM configuration may implement aspects of RAN 100, and may be employed by the transmitting device 202/300 and receiving device 206/400. In this example, a transmitting device (e.g., UE or base station) may include OAM transmitter UCA antennas 605 and a receiving device (e.g., UE or base station) may include OAM receiver UCA antennas 610.

In some aspects, one or both of the OAM transmitter coaxial multi-circle UCA antennas 605 or the OAM receiver coaxial multi-circle UCA antennas 610 may be implemented as a planar array of coaxial UCA antenna elements as described above and illustrated in FIG. 5. In various examples, an OAM transmitter may include the same number of UCA circles as an OAM receiver, but this is not necessarily the case. That is, a transmitting device 202/300 can communicate with a receiving device 206/400 with the same number and with a different number of UCA circles.

According to a further aspect of the present disclosure, a transmitting device may employ a subset (e.g., one or more) of its UCA circles from its transmitter UCA antennas 605 for a given transmission. For example, a transmitting device may multiplex a plurality of beams, streams, or waveforms onto a given wireless resource by transmitting each such stream with a different respective set of one or more UCA circles. Theoretically, streams transmitted via different sets of UCA circles can be orthogonal, such that a receiving device can receive and separately recover these streams received over the same radio resource (e.g., overlapping in the time- and frequency-domains, using the same code, etc.).

In a further aspect, a transmitting device may independently select or control an OAM mode for each of the plurality of multiplexed OAM beams. That is, a transmitting device may utilize a first set of one or more UCA circles to transmit a first OAM beam having a first OAM mode, and a second set of one or more UCA circles to transmit a second OAM beam having a second OAM mode. Here, the first OAM mode (i.e., from the first set of one or more UCA circles) may be the same as, or different from the second OAM mode (i.e., from the second set of one or more UCA circles). Various options and further details of such a system are provided in the discussion that follows.

In the description that follows, for ease of description, reference is made to a UCA configuration such as the ones illustrated in FIGS. 5 and 6. However, it is to be understood that the present disclosure is not limited thereto. Additionally, according to other aspects of this disclosure, reference signal multiplexing using multiple OAM modes may be implemented using any structures that enable OAM multiplexing of electromagnetic signals (e.g., RF signals, light signals, etc.) may apply, including but not limited to UCA antennas, which are described as examples. Signals transmitted (e.g., multiplexed) using multiple OAM modes may be transmitted and/or received using any suitable transmitting components and/or receiving components, which may include or otherwise be configured using any suitably configured phase plates, spatial modulators, integrated circuits, any other suitable components, and/or any suitable combination thereof, for transmission over any suitable medium including a wireless air interface, an optical fiber, etc.

In general, precoding for different OAM modes in a multi-circle OAM communication system may be performed individually, as different OAM modes are orthogonal when the transmitting antenna and receiving antenna are aligned. An OAM receiver may measure per-mode per-circle reference signals, and determine per-mode inter-circle precoding weights. The OAM receiver may then report the results of the measurement to the OAM transmitter. For example, an OAM receiver may report amplitude and phase of each element of a precording vector to an OAM transmitter based on measurements of reference signals. In such an example, as the number of modes and/or circles increases, the costs (e.g., in reduced communication transmission capacity causes by signaling overhead) associated with reporting increases, and may become prohibitively high. As another example, an OAM receiver may report a codeword from an existing codebook (e.g., a precoding matrix indicator (PMI)) associated with MIMO communications. In such an example, the codebook may have been defined based on antennas in a uniform linear array (ULA) and/or uniform planar array (UPA). As described above, while a UCA includes multiple antennas, precoding in a multi-circle UCA communication system may be executed between UCA circles, rather than between different antenna elements (e.g., antenna elements 515 in FIG. 5) of each UCA, and the antenna elements of a UCA are not arranged in a linear array or planar array. Thus the inter-circle channel matrix of a UCA does not match the DFT of a codebook defined for a ULA or UPA. This may lead the beamforming gain and/or throughput to be reduced compared to precoding that takes advantage of the properties of an OAM communication system configured with a multi-circle UCA.

In a co-axial multi-circle OAM communication system, when the UCA circles of a transmitting device and receiving device are aligned, the channel gain of the nth OAM mode $$g_{r_{tx},r_{rx}}^{(n)}$$

is proportional to:

$$\frac{i^n \lambda J_n\left(2\pi \frac{r_{tx} r_{rx}}{\lambda z}\right)}{z} \cdot \exp\left\{-j\frac{2\pi}{\lambda}\left(z + \frac{r_{tx}^2 + r_{rx}^2}{2z}\right)\right\}, \quad (1)$$

where i is $\sqrt{-1}$, λ is the wavelength of the center frequency used to transmit the OAM mode, $J_n$ is the nth order of the Bessel function, $r_{tx}$ is the radius of the transmitting UCA circle, $r_{rx}$ is the receiving UCA circle, z is the distance between the antennas, and j is $\sqrt{-1}$.

Formula-Based Inter-Circle Precoding Weight Determinations

FIG. 7 is a call flow diagram illustrating an exemplary process for formula-based inter-circle precoding weight determination for orbital angular momentum (OAM) communication systems in accordance with some aspects of this disclosure. As described below, some or all illustrated features may be omitted in a particular implementation within the scope of the present disclosure, and some illustrated features may not be required for implementation of all embodiments. In some examples, the process illustrated in FIG. 7 may be carried out by the transmitting device 300 illustrated in FIG. 3 and the receiving device 400 illustrated in FIG. 4. In some examples, the process of FIG. 7 may be carried out by any suitable apparatus or means for carrying out the functions or algorithm described below.

At block 702, a transmitting device (e.g., transmitting device 300) may transmit a signal 704 (e.g., a waveform) that includes reference signal configuration information indicative of which OAM mode is associated with each reference signal.

Additionally, in some aspects, the reference signal configuration information can include information indicative of which transmitting antenna (e.g., corresponding to a particular UCA circle) is to be used to transmit each reference signal. In some aspects, transmission of the information indicative of which transmitting antenna is to be used to transmit each reference signal may be omitted (e.g., if all UCA circles are configured to transmit a reference signal for each OAM mode to be used).

In some aspects, the transmitting device 300 may transmit the information on any suitable channel (e.g., any suitable physical layer channel, such as PDCCH, PUCCH, or PSCCH) via any suitable communication network (e.g., via a RAN, such as RAN 200, and/or via D2D connection, using one or more DL slots, one or more UL slots, one or more SL slots, etc.). In some aspects, the transmitting device 300 may transmit the information using any suitable communication interface, such as a transceiver (e.g., transceiver 310) and antennas (e.g., antennas 311). For example, in some aspects, the transmitting device 300 may transmit the signal 704 using a particular OAM mode and/or multiple OAM modes. As another example, the transmitting device 300 may transmit the signal 704 using any other suitable communication technique(s).

In some aspects, the transmitting device 300 may transmit the reference signal configuration information using any suitable signaling technique or combination of techniques. For example, the transmitting device 300 may transmit the reference signal configuration information using radio resource control (RRC) signaling to. As another example, the transmitting device 300 may transmit the reference signal configuration information using MAC control element (MAC CE) signaling. As yet another example, the transmitting device 300 may transmit the reference signal configuration information using physical layer signaling (which may be referred to as L1 signaling), such as via downlink control information (DCI), uplink control information (UCI), or sidelink control information (SCI) . . . . Additionally or alternatively, the transmitting device 300 may transmit the reference signal configuration information using a combination of signaling techniques, such as one or more of RRC, MAC CE, DCI, UCI, SCI, and/or any other suitable signaling.

In some aspects, the reference signal configuration information may include information related to channel state information reference signals (CSI-RSs) that the transmitting device 300 is scheduled to transmit. Reference signal configuration information that includes information related to CSI-RSs may be referred to as CSI-RS configuration information.

In some aspects, the reference signal configuration information may identify which subset of antenna elements the transmitting device 300 is scheduled to use to transmit each reference signal (e.g., each CSI-RS). For example, the reference signal configuration information may specify that a first UCA circle is schedule to transmit a first reference signal(s), and that a second UCA circle is scheduled to transmit a second reference signal(s).

In some aspects, the reference signal configuration information may identify which subset of antenna elements (e.g., corresponding to a UCA circle) are associated with each reference signal using any suitable technique or combination of techniques. For example, the reference signal configuration information may include CSI-RS resource information, and each UCA circle may be associated with a particular resource (e.g., CSI-RS resource, as described in 3GPP technical specification 38.214) used to transmit reference signals (e.g., a first UCA circle of the transmitting device may be associated with a first CSI-RS resource, a second UCA circle of the transmitting device may be associated with a second CSI-RS resource, etc.). In such an example, reference signals associated with different OAM modes may be associated with a particular port of the resource (e.g., a first OAM mode may be associated with a first port of the CSI-RS resource that is associated with the first UCA antenna, a second OAM mode may be associated with a second port of the CSI-RS resource that is associated with the first UCA antenna, etc.).

As another example, the reference signal configuration information may include CSI-RS resource information, and each UCA circle may be associated with a particular resource set (e.g., a CSI-RS resource set, as described in 3GPP technical specification 38.331) used to transmit reference signals (e.g., a first UCA circle of the transmitting device may be associated with a first CSI-RS resource set, a second UCA circle of the transmitting device may be as associated with a second CSI-RS resource set, etc.). In such an example, reference signals associated with different OAM modes may be associated with a particular resource of the resource set (e.g., a first OAM mode may be associated with a first resource of the CSI-RS resource set that is associated with the first UCA antenna, a second OAM mode may be associated with a second resource of the CSI-RS resource set that is associated with the first UCA antenna, etc.).

In some aspects, the reference signal configuration information may include a property associated with each resource (e.g., each port of each CSI-RS resource, each resource of each CSI-RS resource set, etc.) that indicates which OAM mode is to be used to transmit each reference signal (e.g., each CSI-RS). In some aspects, the property may be an OAM mode index. For example, the OAM mode index may be indicated using one or more bits in the reference signal configuration information (e.g., a byte). In such an example, a positive or negative OAM mode may be indicated using a bit (e.g., a first bit) to express position or negative, or using complement code (e.g., two's complement).

In some aspects, the reference signal configuration information may include a property indicating a maximum number of simultaneous modes that each UCA circle (e.g., a CSI-RS resource, a CSI-RS resource set, one or more ports associated with a CSI-RS resource, one or more resources associated with a CSI-RS resource set, etc.) of the transmitting device may transmit. For example, the reference signal configuration information may include an indication that the first UCA antenna (e.g., associated with CSI-RS resource 1, associated with CSI-RS resource set 1, etc.) is configured to transmit up to a particular number of OAM modes simultaneously (e.g., one mode, two modes, three modes, etc.), and an indication that the second UCA antenna (e.g., associated with CSI-RS resource 2, associated with CSI-RS resource set 2, etc.) is configured to transmit up to a particular number of OAM modes simultaneously (e.g., one mode, two modes, three modes, etc.). In some aspects, the property indicating a maximum number of simultaneous modes that each UCA circle of the transmitting device may transmit may be included in the reference signal configuration information using any suitable number of bits associated with one or more of the UCA circles. As described above in connection with FIG. 3, the maximum number of OAM modes that the transmitting device 300 is configured to simultaneously transmit (and/or receive) using a particular UCA may be determined by the number of TXRUs associated with the UCA. For example, if the transmitting unit 300 includes two TXRUs associated with a first UCA, the UCA may be capable of transmitting no more than two OAM modes simultaneously. In some aspects, if a maximum number of simultaneous modes that a particular UCA circle of the transmitting device is configured to transmit is larger than or equal to the number of OAM modes that the transmitting device is configured to use, information related to the maximum may be omitted from the reference signal configuration information.

At block 706, a receiving device (e.g., receiving device 400) may receive the signal 704. For example, in some aspects, the receiving device 400 may receive the information on any suitable channel (e.g., any suitable physical layer channel, such as PDCCH, PUCCH, or PSCCH) via any suitable communication network (e.g., via a RAN, such as RAN 200, and/or via D2D connection, using one or more DL slots, one or more UL slots, one or more SL slots, etc.). In some aspects, the receiving device may receive the signal 704 using any suitable communication interface, such as a transceiver (e.g., transceiver 410) and antennas (e.g., antennas 411). In some aspects, the receiving device can receive the signal 704 by sampling and buffering a received wireless signal on an appropriate channel, and applying suitable processing to the buffered signal such as energy detection, demodulation (e.g., using a demodulation function associated with the OAM mode used to transmit and receive the signal 704, and based on a channel matrix), decoding, etc.

In some aspects, the receiving device 400 may store the information received at block 706 in memory, and/or may store information derived from the invention received at block 706 in memory. For example, the receiving device 400 may store information indicative of which OAM modes are to be used to transmit reference signals (e.g., CSI-RSs). In a more particular example, the receiving device 400 may store a list indicative of which OAM modes are to be used to transmit reference signals (e.g., as described above in connection with block 702). As another more particular example, the receiving device 400 may store a table indicative of which OAM modes are to be used to transmit reference signals (e.g., as described above in connection with block 702). As yet another more particular example, the receiving device 400 may store a value(s) indicative of which OAM modes are to be used to transmit reference signals.

As another example, the receiving device 400 may store information indicative of which subset of antenna elements (e.g., which UCA circle) is associated with each reference signal. As yet another example, the receiving device 400 may store information indicative of how many OAM modes each subset of antenna elements is capable of transmitting simultaneously.

At block 708, the receiving device (e.g., receiving device 400) may determine one or more antenna elements to be used to receive reference signals to be transmitted by the transmitting device. For example, the receiving device 400 may determine which subset of antenna elements (e.g., UCA circles) to use to receive CSI-RSs associated with each OAM mode. In such an example, the selection may be based on various considerations, such as the size of each subset of antenna elements used to receive the reference signals (e.g., the radius of each UCA circle), the number of OAM modes that a particular subset of antenna elements is configured to simultaneously receive (e.g., based on the number of TXRUs associated with the subset of antenna elements), the total number of OAM modes to be received, etc.

In a more particular example, the receiving device 400 may determine that a first UCA circle is to be used to receive a reference signal(s) transmitted using a first OAM mode (e.g., OAM mode 1), a second UCA circle is to be used to receive a reference signal(s) transmitted using the first OAM mode (e.g., OAM mode 1) and a second OAM mode (e.g., OAM mode 2), and a third UCA circle is to be used to receive a reference signal(s) transmitted using the second OAM mode (e.g., OAM mode 2). In such an example, the first UCA circle and the third UCA circle may be limited to simultaneously receiving one OAM mode (e.g., if only one TXRU is associated with each UCA circle), while the second UCA circle may be configured to simultaneously receive multiple OAM modes (e.g., if more than one TXRU is associated with the second UCA circle).

In some aspects, the receiving device 400 may attempt to select receiving antenna elements to use for receiving the reference signals to insure that all reference signals to be transmitted by the transmitting device are associated with at least one receiving antenna (e.g., at least one UCA circle of the receiving device).

At block 710, the transmitting device (e.g., transmitting device 300) may transmit multiple signals 712 (e.g., as multiple waveforms and/or multiplexed signals on a single waveform) that each includes one or more reference signals. In some aspects, each reference signal transmitted at block 710 may be transmitted using a particular OAM mode, and may be transmitted using a particular UCA circles.

In some aspects, the transmitting device 300 may transmit the signals on any suitable channel (e.g., any suitable physical layer channel, such as PDCCH, PUCCH, or PSCCH) via any suitable communication network (e.g., via a RAN, such as RAN 200, and/or via D2D connection, using one or more DL slots, one or more UL slots, one or more SL slots, etc.). In some aspects, the transmitting device 300 may transmit the information using any suitable communication interface, such as a transceiver (e.g., transceiver 310) and antennas (e.g., antennas 311). For example, in some aspects, the transmitting device 300 may transmit the signal 704 using a particular OAM mode and/or multiple OAM modes. As another example, the transmitting device 300 may transmit the signal 704 using any other suitable communication technique(s).

In some aspects, the transmitting device may transmit multiple reference signals in parallel (e.g., using the same UCA antenna, or different UCA antennas). For example, the transmitting device may be configured to transmit reference signals associated with different OAM modes simultaneously, as different OAM modes are generally orthogonal. In such an example, the transmitting device may use a single UCA circle that is configured to transmit multiple OAM modes (e.g., using multiple TXRUs associated with the UCA circle) to simultaneously transmit reference signals (e.g., CSI-RSs) for multiple modes. Alternatively, the transmitting device may use a multiple UCA circles to simultaneously transmit reference signals (e.g., CSI-RSs) for multiple modes when at least one of the UCA circles is configured to transmit only a single OAM mode simultaneously (e.g., the UCA circle is associated with a single TXRU).

At block 714, the receiving device (e.g., receiving device 400) may receive the reference signals transmitted in signals 712 using any suitable UCA antennas (and/or any other suitable antenna). For example, in some aspects, the receiving device 400 may receive the information on any suitable channel (e.g., any suitable physical layer channel, such as PDCCH, PUCCH, or PSCCH) via any suitable communication network (e.g., via a RAN, such as RAN 200, and/or via D2D connection, using one or more DL slots, one or more UL slots, one or more SL slots, etc.). In some aspects, the receiving device may receive the signals 712 using any suitable communication interface, such as a transceiver (e.g., transceiver 410) and antennas (e.g., antennas 411). In some aspects, the receiving device can receive the signals 712 by sampling and buffering a received wireless signal on an appropriate channel, and applying suitable processing to the buffered signal such as energy detection, demodulation (e.g., using a demodulation function associated with the OAM mode used to transmit and receive the signals 712, and based on a channel matrix), decoding, etc.

At block 716, the receiving device (e.g., receiving device 400) may estimate channel gain for pairs of transmission and reception antennas (e.g., pairs of UCA circles) based on the received reference signals. In some aspects, the receiving device 400 may use any suitable technique or combination of techniques to measure the channel between each UCA circle used to transmit a reference signal (e.g., a CRI-RS) and each UCA circle used to receive reference signals for an OAM mode. For example, based on information received in reference signal configuration information, the receiving device may measure the channel and estimate the channel gain, and/or any other suitable properties (e.g., channel quality indicator (CQI), rank indicator (RI), etc.) associated with the channel based on measurement of the channel. In some aspects, the receiving device may estimate the channel gain h for a particular reference signal based on the OAM mode used to transmit the reference signal (e.g., based on the OAM mode indicated in the reference signal configuration information received at 706) based on the symbol x associated with the reference signal and received signal y. For example, the receiving device may estimate the channel gain h based on the ratio of the x and y (e.g., using the relationship $h=y/x$).

In some aspects, the receiving device 400 may determine which pair(s) of transmitting and receiving antennas provide the best channel quality (e.g., based on the channel gain associated with the pair) for a particular OAM mode. For example, the receiving device 400 may allocate UCA circles of the receiving device 400 to all used OAM modes based on the number of OAM modes used by the transmitting device. As another example, the receiving device 400 may allocate UCA circles of the receiving device 400 to particular OAM modes based on channel quality (e.g., channel gain) between the UCA circle and a UCA circle of the transmitting device for a particular OAM mode. In some aspects, the receiving device 400 may allocate fewer UCA circles of the receiving device 400 to a particular OAM mode than were used to receive that OAM mode at block 714.

In some aspects, the receiving device 400 may identify which OAM modes, from which transmitting antennas (e.g., UCA circles of the transmitting device) are to be received by a particular subset of receiving antenna elements based on the resources associated with the reference signals. For example, the receiving device 400 may determine that a first UCA circle (e.g., Rx circle 1) and a second UCA circle (e.g., Rx circle 2) are to be used to receive a first OAM mode (e.g., OAM mode 1), and that the second UCA circle (e.g., Rx circle 2) and a third UCA circle (e.g., Rx circle 3) are to be used to receive a second OAM mode (e.g., OAM mode 1). In such an example, the determination may be based, in part, on the first and third UCA circles (e.g., Rx circle 1 and Rx circle 3) being limited to receiving a single OAM mode, and the second UCA circle (e.g., Rx circle 2) being capable of receiving at least two OAM modes.

In some aspects, the receiving device may select transmitting device resources to be used to transmit each OAM mode based on the allocated receiving antennas and/or the number of OAM modes that the transmitting antennas are configured to simultaneously transmit. For example, the receiving device may select ports {port 1 of CSI-RS resource 1, port 1 of CSI-RS resource 2} for OAM mode 1, and {port 2 of CSI-RS resource 2} selected for OAM mode 2 based on the number of simultaneous OAM modes that the transmitting antennas are capable of transmitting (e.g., based on information received in the reference signal configuration information), and/or the channel measurement by the receiving device.

In some aspects, the receiving device 400 (and/or transmitting device 300) may determine a matrix of possible transmission/receiving pairs for each OAM mode based on the allocated Rx UCA circles and the selected Tx UCA circles. For example, if the receiving device allocates Rx circle 1 and Rx circle 2 to be used to receive OAM mode 1, and Rx circle 2 and Rx circle 3 to be used to receive OAM mode 2, and selects {port 1 of CSI-RS resource 1, port 1 of CSI-RS resource 2} for OAM mode 1, and {port 2 of CSI-RS resource 2} selected for OAM mode 2, OAM mode 1 may be associated with a 2×2 channel matrix, and OAM mode 2 may be associated with a 2×1 channel matrix.

At block 718, the receiving device (e.g., receiving device 400) may transmit a signal 720 (e.g., a waveform) that includes information indicative of which UCA circles the receiving device 400 used (and/or expects to use) to receive the reference signals (and/or other communications). For example, the receiving device 400 may include information indicative of which UCA circle(s) the receiving device 400 used to receive the reference signals at 714 for each OAM mode. As another example, the receiving device 400 may include information indicative of which UCA circles the receiving device 400 allocated at 716 to potentially receive future signals (e.g., reference signals, communication signals, etc.) for each OAM mode. Additionally, in some aspects, the receiving device 400 may transmit information indicative of the size of the UCA circles used to receive the reference signals and/or allocated to receive future signals.

In some aspects, the receiving device 400 may transmit the information on any suitable channel (e.g., any suitable physical layer channel, such as PDCCH, PUCCH, or PSCCH) via any suitable communication network (e.g., via a RAN, such as RAN 200, and/or via D2D connection, using one or more DL slots, one or more UL slots, one or more SL slots, etc.). In some aspects, the receiving device 400 may transmit the information using any suitable communication interface, such as a transceiver (e.g., transceiver 410) and antennas (e.g., antennas 411). For example, in some aspects, the receiving device 400 may transmit the signal 720 using a particular OAM mode and/or multiple OAM modes. As another example, the receiving device 400 may transmit the signal 720 using any other suitable communication technique(s).

In some aspects, the information transmitted at block 718 may include information indicative of the radius of UCA circles of the receiving device 400. For example, the receiving device 400 may include information indicating that a radius of a first UCA circle (e.g., Rx circle 1) is $r_1$, that a radius of a second UCA circle (e.g., Rx circle 2) is $r_2$, and so on.

In some aspects, the receiving device 400 may include information indicative of the radius of UCA circles of the receiving device 400 in any suitable format. For example, the receiving device 400 may include information a field in which identifying information and/or circle radius information may be included (e.g., as a floating point value). In a more particular example, the receiving device 400 may include a list of radius values (e.g., $\{r_{rx,1}, r_{rx,2}, \ldots, r_{rx,n}\}$).

As another example, the receiving device 400 may include information indicating which UCA circles were used (and/or are expected to be used) in connection with which OAM mode separately from information indicating the radius of each UCA circle.

In some aspects, the receiving device 400 may separately communication information indicative of the radius of each UCA circle and information indicative of which UCA circles were used (and/or are expected to be used) for each OAM mode. For example, the receiving device 400 may communicate circle radius information at a lower periodicity than information indicating which UCA circles were used (and/or are expected to be used) for each OAM mode. In such an example, the receiving device 400 may communicate circle radius information at any suitable time, such as during a process to initially establish a connection between the transmitting device and the receiving device, periodically (e.g., at regular and/or irregular intervals, such as after a predetermined period of time has elapse, after a connection has been interrupted, etc.), and/or at any other suitable time(s). The receiving device 400 may communicate information indicative of which UCA circle(s) were used (and/or are expected to be used) for each OAM mode periodically (e.g., at regular and/or irregular intervals), such as after (e.g., in response to) receiving reference signals (e.g., CSI-RSs) and/or measuring channel gains.

In some aspects, the receiving device 400 may transmit information indicative of which UCA circle(s) were used (and/or are expected to be used) for each OAM mode in any suitable format at block 718. For example, transmitting device 400 may transmit information indicative of which UCA circle(s) were used (and/or are expected to be used) for each OAM mode using a bitmap in which each bit corresponds to a UCA circle of the receiving device 400. In such an example, the bitmap may have a bit for each UCA circle (e.g., at least three bits if there are at three UCA circles, at least four bits if there are at four UCA circles, etc.) with bits used to receive OAM mode 1 having a value that indicates that the UCA circle was used (e.g., a binary 1 or a binary 0). In a more particular example, if a first UCA circle (e.g., Rx Circle 1) and a second UCA circle (e.g., Rx Circle 2) are used to receive a first OAM mode (e.g., OAM mode 1), and the second UCA circle (e.g., Rx circle 2) and a third UCA circle (e.g., Rx circle 3) are used to receive a second OAM mode (e.g., OAM mode 2), the receiving device 400 may transmit a binary string "011" associated with OAM mode 1 indicating that Rx circle 1 and Rx circle 2 were used to receive OAM mode 1 and another binary string "110" associated with OAM mode 2 indicating that Rx circle 2 and Rx circle 3 were used to receive OAM mode 1. Note that in this example the least significant bit is associated with Rx circle 1. However, this is an example, and the mapping of bits to OAM modes may be configured using any suitable scheme (e.g., a most significant bit may be associated with Rx circle 1).

In some aspects, the receiving device 400 may transmit information indicative of which UCA circle(s) of the transmitting device is preferred by the receiving device for each OAM mode at block 718. For example, the receiving device 400 may indicate a CSI-RS port index or CSI-RS resource indicator (CRI) associated with a particular OAM mode and/or transmitting device UCA circle. In such an example, the receiving device 400 may transmit information indicative of preferred transmitting device UCA circle(s) (Tx UCA circles) for each OAM mode using a bitmap in which each bit corresponds to a reference signal transmission resource. The bitmap may have a bit for each port associated with each Tx UCA circle in the reference signal configuration information (e.g., at least four bits if there are at two Tx UCA circles with two ports each) with bits associated with preferred transmission resources for OAM mode 1 having a value that indicates a preference for that UCA circle (e.g., a binary 1 or a binary 0). In a more particular example, a first port associated with a first UCA circle (e.g., port 1 for Tx Circle 1) and a first port associated with a second UCA circle (e.g., port 1 for Tx Circle 2) may be preferred for a first OAM mode (e.g., OAM mode 1), and a second port associated with the second UCA circle (e.g., port 2 for Tx circle 2) may be preferred for a second OAM mode (e.g., OAM mode 2). The receiving device 400 may communicate this information using a binary string "0101" associated with OAM mode 1 indicating that port 1 of CSI-Resource 1 (associated with the two least significant bits) and port 1 of CSI-Resource 2 (associated with the two most significant bits) are preferred by the receiving device for mode 1, and another binary string "1000" associated with OAM mode 2 indicating that port 2 of CSI-Resource 2 (associated with the two least significant bits) is preferred by the receiving device for mode 2.

In some aspects, the receiving device 400 may transmit a rank indicator (RI) and channel quality information (CQI) for each OAM mode at block 718.

In some aspects, the receiving device 400 may transmit the information at block 718 using any suitable signaling technique and/or protocol. For example, the receiving device 400 may transmit the information at block 718 using radio resource control (RRC) signaling. As another example, the receiving device 400 may transmit the information at block 718 using medium access control (MAC) control element (CE) signaling. As another example, the receiving device 400 may transmit the information at block 718 using physical layer signaling (which may be referred to as L1 signaling), such as via downlink control information (DCI), uplink control information (UCI), or sidelink control information (SCI). In such an example, the receiving device may transmit the information at block 718 as a CSI report.

At block 722, the transmitting device (e.g., transmitting device 300) may receive the signal 720, and the information indicative of which UCA circles the receiving device 400 used (and/or expects on using) to receive the reference signals using any suitable UCA antennas (and/or any other suitable antenna). For example, in some aspects, the transmitting device 300 may receive the information on any suitable channel (e.g., any suitable physical layer channel, such as PDCCH, PUCCH, or PSCCH) via any suitable communication network (e.g., via a RAN, such as RAN 200, and/or via D2D connection, using one or more DL slots, one or more UL slots, one or more SL slots, etc.). In some aspects, the receiving device may receive the signal 720 using any suitable communication interface, such as a transceiver (e.g., transceiver 410) and antennas (e.g., antennas 411). In some aspects, the receiving device can receive the signal 720 by sampling and buffering a received wireless signal on an appropriate channel, and applying suitable processing to the buffered signal such as energy detection, demodulation (e.g., using a demodulation function associated with the OAM mode used to transmit and receive the signal 720, and based on a channel matrix), decoding, etc.

At block 724, the transmitting device (e.g., transmitting device 300) may determine precoding weights for multiple OAM modes based on information about the UCA circles used to receive the reference signals. As described above in connection with FIG. 6 and EQ. (1), the channel gain between any UCA transmitter/receiver circle pair may be calculated based on the radius of each circle, the distance between the circles, and the wavelength used to transmit the OAM mode.

In some aspects, the transmitting device 300 may calculate a channel gain for each pair of transmitting device antennas (e.g., Tx UCA circles) and receiving device antennas (e.g., Rx UCA circles) (e.g., based on EQ. (1)).

In some aspects, the transmitting device 300 may use information received from the receiving device to determine which pairs of transmitter/receiver circles for which to calculate a gain. For example, the transmitting device 300 may use information indicating which receiver UCA circles were used in connection with each OAM (e.g., allocated by the receiving device). In a more particular example, the transmitting device 300 may use a bitmap associated with the a first OAM mode to determine which Rx circles were used (and/or are expected to be used) to receive the reference signal associated with the first OAM mode, and may use a bitmap associated with a second OAM mode to determine which Rx circles were used (and/or are expected to be used) to receive the reference signal associated with the second OAM mode.

As another example, the transmitting device 300 may use information indicating which transmitter UCA circles are preferred by the receiving device for each OAM mode. In a more particular example, the transmitting device 300 may use a bitmap associated with the a first OAM mode to determine which Tx circles are preferred by the receiving device for transmitting communications using the first OAM mode, and may use a bitmap associated with a second OAM mode to determine which Tx circles are preferred by the receiving device for transmitting communications using the second OAM mode.

In some aspects, the transmitting device 400 may calculate a channel response matrix based on the channel gain from various pairs of transmitter and receiver UCA circles. For example, assuming that Tx circle 1 and Tx circle 2 (whose radius $r_{tx,1}$, $r_{tx,2}$ are known by OAM transmitter) are to be used for a first OAM mode (e.g., based on preference information from the receiving device), that Rx radiuses $r_{rx,1}$, $r_{rx,2}$ were reported as used to receive reference signals for the first OAM mode, and a rank L for OAM mode n was reported by the receiving device (e.g., as an RI associated with OAM mode n), Then the channel response matrix may be represented as $$H_n = \begin{bmatrix} J_n\left(2\pi\frac{r_{tx,1}r_{rx,1}}{\lambda z}\right)\exp\left\{-j\frac{2\pi}{\lambda}\left(z+\frac{r_{tx,1}^2+r_{rx,1}^2}{2z}\right)\right\} & J_n\left(2\pi\frac{r_{tx,2}r_{rx,1}}{\lambda z}\right)\exp\left\{-j\frac{2\pi}{\lambda}\left(z+\frac{r_{tx,2}^2+r_{rx,1}^2}{2z}\right)\right\} \\ J_n\left(2\pi\frac{r_{tx,1}r_{rx,2}}{\lambda z}\right)\exp\left\{-j\frac{2\pi}{\lambda}\left(z+\frac{r_{tx,1}^2+r_{rx,2}^2}{2z}\right)\right\} & J_n\left(2\pi\frac{r_{tx,2}r_{rx,2}}{\lambda z}\right)\exp\left\{-j\frac{2\pi}{\lambda}\left(z+\frac{r_{tx,2}^2+r_{rx,2}^2}{2z}\right)\right\} \end{bmatrix}$$

where $J_n$ is the nth order of the Bessel function, $\lambda$ is the wavelength of the center frequency used to transmit the nth OAM mode, z is the distance between the antennas, and j is $\sqrt{-1}$. In some aspects, z may be known to the transmitting device and/or receiving device (e.g., it may be provided as input during a configuration process), may be measured by the transmitting device and/or receiving device (e.g., using a laser rangefinder, using global positioning data, etc.) and/or may be reported from another device (e.g., to the transmitting device from the receiving device, to the receiving device from the transmitting device, from a different device, etc.).

In some aspects, the transmitting device 400 may calculate a channel response matrix $H_n$ for each OAM mode n, and may determine a precoding vector by determining the L dominant singular vectors of $H_n$ for OAM mode n, where L is the rank associated with OAM mode n. In some aspects, the transmitting device may use any suitable technique or combination of techniques to determine the L dominant singular vectors of $H_n$, such as singular value decomposition techniques. For example, channel response matrix $H_n$ may be decomposed into a product of three matrices, such that $H_n=UDV^H$ where D is a diagonal matrix, and U and V are orthogonal or unitary matrices, with columns of V correspond to the largest singular values in D.

In some aspects, utilizing a formula to calculate the channel response of Tx/Rx circle pairs may utilize OAM receiver feedback indicating Tx/Rx circle selection results and Rx radiuses based on calculations at the receiving device. This may reduce feedback overhead compared to schemes that report the amplitude and phase of each element of a precording vector to the transmitted. This may also improve accuracy compared to scheme that use a PMI of a codebook developed for ULAs and/or UPAs. In some aspects, calculating a channel response matrix and/or precoding weights for pairs OAM modes may improve beamforming gain and/or throughput of OAM communications.

FIG. 8 is a flow chart illustrating an exemplary process for an OAM transmitting device to determine inter-circle precoding weights for an OAM communication system in accordance with some aspects of this disclosure.

At block 802, a transmitting device (e.g., transmitting device 300) may transmit a reference signal (e.g., a channel state information reference signal (CSI-RS)) for a first orbital angular momentum (OAM) mode using a first subset of antenna elements (e.g., a first uniform circular array (UCA) circle). In some aspects, the transmitting device 300 may transmit the reference signal on any suitable channel (e.g., any suitable physical layer channel, such as PDCCH, PUCCH, or PSCCH) via any suitable communication network (e.g., via a RAN, such as RAN 200, and/or via D2D connection, using one or more DL slots, one or more UL slots, one or more SL slots, etc.). In some aspects, the transmitting device 300 may transmit the reference signal using any suitable communication interface, such as a transceiver (e.g., transceiver 310) and antennas (e.g., antennas 311). For example, in some aspects, the transmitting device 300 may transmit the reference signal using a particular OAM mode and/or multiple OAM modes. As another example, the transmitting device 300 may transmit the reference signal using any other suitable communication technique(s).

At block 804, the transmitting device (e.g., transmitting device 300) may transmit another reference signal (e.g., a CSI-RS) for the first OAM mode using a second subset of antenna elements (e.g., a second UCA circle). In some aspects, the transmitting device 300 may transmit the reference signal on any suitable channel (e.g., any suitable physical layer channel, such as PDCCH, PUCCH, or PSCCH) via any suitable communication network (e.g., via a RAN, such as RAN 200, and/or via D2D connection, using one or more DL slots, one or more UL slots, one or more SL slots, etc.). In some aspects, the transmitting device 300 may transmit the reference signal using any suitable communication interface, such as a transceiver (e.g., transceiver 310) and antennas (e.g., antennas 311). For example, in some aspects, the transmitting device 300 may transmit the reference signal using a particular OAM mode and/or multiple OAM modes. As another example, the transmitting device 300 may transmit the reference signal using any other suitable communication technique(s).

At block 806, the transmitting device (e.g., transmitting device 300) may receive (e.g., from a receiving device, such as receiving device 400) information indicative of a subset of antenna elements to use to transmit communications (e.g., to the receiving device 400) via the first OAM mode.

FIG. 9. is a flow chart illustrating an exemplary process for an OAM receiving device to determine information for a transmitting device to determine inter-circle precoding weights for an OAM communication system in accordance with some aspects of this disclosure.

At block 902, a receiving device (e.g., receiving device 400) may receive an indication of a subset of antenna elements (e.g., configured as a UCA circle) that are to be used to transmit a first reference signal (e.g., a CSI-RS) for a first OAM mode. For example, in some aspects, the receiving device 400 may receive a signal encoded with the indication on any suitable channel (e.g., any suitable physical layer channel, such as PDCCH, PUCCH, or PSCCH) via any suitable communication network (e.g., via a RAN, such as RAN 200, and/or via D2D connection, using one or more DL slots, one or more UL slots, one or more SL slots, etc.). In some aspects, the receiving device may receive the signal encoded with the indication using any suitable communication interface, such as a transceiver (e.g., transceiver 410) and antennas (e.g., antennas 411). In some aspects, the receiving device can receive the signal encoded with the indication by sampling and buffering a received wireless signal on an appropriate channel, and applying suitable processing to the buffered signal such as energy detection, demodulation (e.g., using a demodulation function associated with the OAM mode used to transmit and receive the signal, and based on a channel matrix), decoding, etc.

At block 904, the receiving device (e.g., receiving device 400) may receive an indication that another subset of antenna elements (e.g., configured as a second UCA circle) are to be used to transmit a second reference signal (e.g., a CSI-RS) for the first OAM mode. For example, in some aspects, the receiving device 400 may receive a signal encoded with the indication on any suitable channel (e.g., any suitable physical layer channel, such as PDCCH, PUCCH, or PSCCH) via any suitable communication network (e.g., via a RAN, such as RAN 200, and/or via D2D connection, using one or more DL slots, one or more UL slots, one or more SL slots, etc.). In some aspects, the receiving device may receive the signal encoded with the indication using any suitable communication interface, such as a transceiver (e.g., transceiver 410) and antennas (e.g., antennas 411). In some aspects, the receiving device can receive the signal encoded with the indication by sampling and buffering a received wireless signal on an appropriate channel, and applying suitable processing to the buffered signal such as energy detection, demodulation (e.g., using a demodulation function associated with the OAM mode used to transmit and receive the signal, and based on a channel matrix), decoding, etc.

In some aspects, the indication received at block 902 and the indication received at block 904 can be received together (e.g., within a single message).

At block 906, the receiving device (e.g., receiving device 400) may transmit information indicative of a subset of antenna elements (e.g., a particular UCA circle of the receiving device) that was used to receive the first reference signal.

Figure 10:
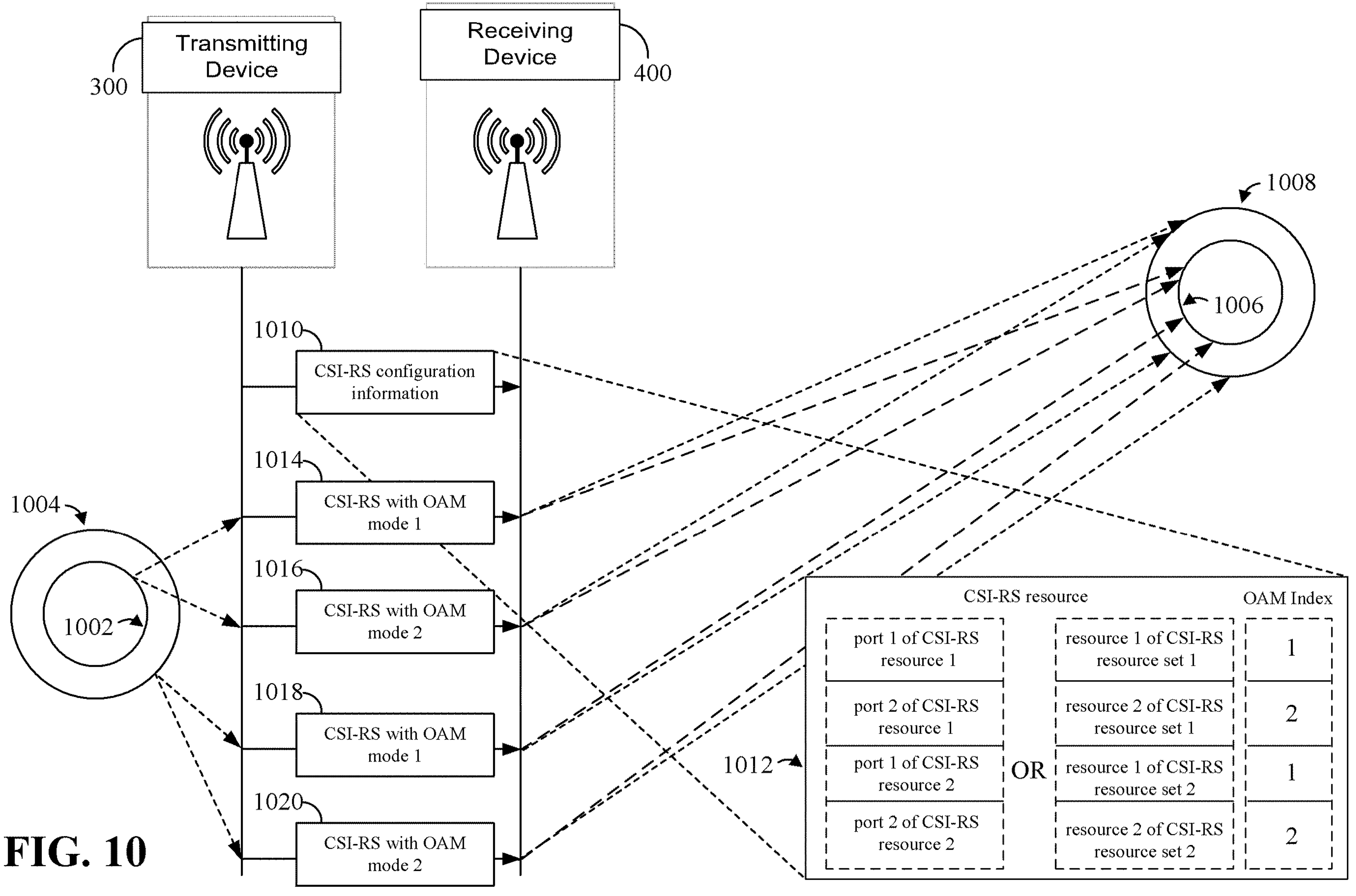
FIG. 10 is a call diagram illustrating transmission of reference signal configuration information and transmission of reference signals for multiple OAM modes using multiple uniform circular array circles in accordance with some aspects of this disclosure.

FIG. 10 is a diagram illustrating transmission of reference signal configuration information and transmission of reference signals for multiple OAM modes using multiple uniform circular array circles in accordance with some aspects of this disclosure.

In FIG. 10, the transmitting device 300 includes a first UCA circle 1002 and a second UCA circle 1004, and the receiving device includes a first UCA circle 1006 and a second UCA circle 1008. As described above in connection with block 702 of FIG. 7, the transmitting device 300 may transmit CSI-RS configuration information at block 1010, which may include CSI-RS resource information 1012.

In some aspects, the CSI-RS resource information 1012 may include information identifying CSI-RS resources, which may be associated with a particular UCA circle and/or a particular OAM mode. For example, the CSI-RS resource information 1012 may include information identifying a first CSI-RS resource (e.g., CSI-RS resource 1), having two ports associated with a first OAM mode and a second OAM mode, respectively (e.g., identified based on an OAM index value associated with each port). In such an example, the first CSI-RS resource may be associated with the UCA circle 1002, and may or may not explicitly identify the antenna associated with the CSI-RS resource. The CSI-RS resource information 1012 may also include information identifying a second CSI-RS resource (e.g., CSI-RS resource 2), having two ports associated with a first OAM mode and a second OAM mode, respectively.

As another example, the CSI-RS resource information 1012 may include information identifying a first CSI-RS resource set (e.g., CSI-RS resource set 1), having two ports associated with a first OAM mode and a second OAM mode, respectively (e.g., identified based on an OAM index value associated with each port). In such an example, the first CSI-RS resource set may be associated with the UCA circle 1002, and may or may not explicitly identify the antenna associated with the CSI-RS resource. The CSI-RS resource information 1012 may also include information identifying a second CSI-RS resource (e.g., CSI-RS resource 2), having two ports associated with a first OAM mode and a second OAM mode, respectively. The second CSI-RS resource set may be associated with the UCA circle 1004.

At block 1014, the transmitting device 300 may transmit a first CSI-RS using a first OAM mode (e.g., OAM mode 1), and at block 1016 the transmitting device 300 may transmit a second CSI-RS using a second OAM mode (e.g., OAM mode 2). In some aspects, the transmitting device may transmit the first CSI-RS and second CSI-RS simultaneously (e.g., using the same transmission resources, but different OAM modes) or serially (e.g., using different transmission resources and different OAM modes).

The receiving device 400 may receive the first CSI-RS and the second CSI-RS using the UCA circle 1006 and/or the UCA circle 1008.

At block 1018, the transmitting device 300 may transmit a third CSI-RS using the first OAM mode (e.g., OAM mode 1), and at block 1020 the transmitting device 300 may transmit a fourth CSI-RS using the second OAM mode (e.g., OAM mode 2). In some aspects, the transmitting device may transmit the third CSI-RS and fourth CSI-RS simultaneously (e.g., using the same transmission resources, but different OAM modes) or serially (e.g., using different transmission resources and different OAM modes). Note that the first CSI-RS and the third CSI-RS may be transmitted simultaneously if they two signals are transmitted using orthogonal resources (e.g., different wavelengths resources, using different codes, etc.), but may be inhibited from being transmitted simultaneously if the transmission resources are otherwise the same (e.g., as two signals from different UCA circles with the same OAM mode are not orthogonal).

The receiving device 400 may receive the third CSI-RS and the fourth CSI-RS using the UCA circle 1006 and/or the UCA circle 1008.

As described above in connection with block 716 of FIG. 7, the receiving device 400 may calculate a channel gain for one or more pairs of transmitter and receiver antennas based on the received CSI-RS. As described above in connection with block 718 of FIG. 7, the receiving device 400 may report information to the transmitting device 300 that may be used to generate a precoding vector that may be used to transmit information between the transmitting device 300 and the receiving device 400.

Further Examples Having a Variety of Features

Implementation examples are described in the following numbered clauses:

1. An apparatus configured for wireless communication, comprising: a processor; a plurality of antenna elements, comprising a first subset of antenna elements that includes at least a first antenna element and a second antenna element, and a second subset of antenna elements that includes at least a third antenna element and a fourth antenna element; and a memory coupled to the processor, wherein the processor is configured to: transmit, via the first subset of antenna elements, a first reference signal using a first orbital angular momentum (OAM) mode; transmit, via the second subset of antenna elements, a second reference signal using the first OAM mode; and receive information indicative of a subset of antenna elements of the plurality of antenna elements to use to transmit the first OAM mode.
2. The apparatus of clause 1, wherein the first reference signal comprises a first channel state information reference signal (CSI-RS), and the second reference signal comprises a second CSI-RS.
3. The apparatus of clause 1, wherein execution of the instructions further causes the processor to: transmit reference signal configuration information that indicates that a first subset of reference signals of a plurality of reference signals are associated with the first OAM mode . . .
4. The apparatus of clause 3, wherein the reference signal configuration information indicates that a second subset of reference signals of the plurality of reference signals are associated with a second OAM mode.
5. The apparatus of any one of clauses 3 or 4, wherein the reference signal configuration information indicates that the first subset of antenna elements are to be used to transmit the first reference signal, and that the second subset of antenna elements are to be used to transmit the second reference signal.

6. The apparatus of any one of clauses 3 to 5, wherein the reference signal configuration information comprises information indicating that the first subset of antenna elements corresponds to a first CSI-RS resource, and information indicating that the second subset of antenna elements corresponds to a second CSI-RS resource.
7. The apparatus of clause 6, wherein the reference signal configuration information comprises information indicating that the first reference signal is to be transmitted using a first port of the first CSI-RS resource, and information indication that the second reference signal is to be transmitted using a first port of the second CSI-RS resource.
8. The apparatus of clause 7, wherein the reference signal configuration information comprises information indicating that a third reference signal is to be transmitted using a second port of the first CSI-RS resource, and information indication that a fourth reference signal is to be transmitted using a second port of the second CSI-RS resource.
9. The apparatus of any one of clauses 3 to 5, wherein the reference signal configuration information comprises information indicating that the first subset of antenna elements corresponds to a first CSI-RS resource set, and information indicating that the second subset of antenna elements corresponds to a second CSI-RS resource set.
10. The apparatus of clause 9, wherein the reference signal configuration information comprises information indicating that the first reference signal is to be transmitted using a first resource of the first CSI-RS resource set, and information indication that the second reference signal is to be transmitted using a first resource of the second CSI-RS resource set.
11. The apparatus of clause 10, wherein the reference signal configuration information comprises information indicating that a third reference signal is to be transmitted using a second resource of the first CSI-RS resource set, and information indication that a fourth reference signal is to be transmitted using a second resource of the second CSI-RS resource set . . . .
12. The apparatus of any one of clauses 3 to 11, wherein the reference signal configuration information comprises an OAM mode index parameter associated with the first reference signal that indicates which OAM mode is to be used to transmit the first reference signal . . . .
13. The apparatus of any one of clauses 1 to 12, wherein execution of the instructions further causes the processor to: transmit, via the first subset of antenna elements, a third reference signal using third resources and a second OAM mode; transmit, via the second subset of antenna elements, a fourth reference signal using fourth resources and the second OAM mode; and receive information indicative of a subset of antenna elements of the plurality of antenna elements to use to transmit the second OAM mode.
14. The apparatus of clause 1, further comprising: a first uniform circular array (UCA) comprising the first subset of antenna elements, wherein the first UCA has a first radius; and a second UCA comprising the second subset of antenna elements, wherein the second UCA has a second radius and is coaxial with the first UCA.
15. The apparatus of any one of clauses 1 to 14, wherein the information indicative of a subset of antenna elements of the plurality of antenna elements to use to transmit the first OAM mode comprises: information indicative of a radius of a first uniform circular array (UCA) used by a receiving apparatus to receive the first reference signal; and information indicative of a radius of a second UCA used by the receiving apparatus to receive the second reference signal.
16. The apparatus of clause 15, wherein execution of the instructions further causes the processor to: receive a message comprising a first value corresponding to the radius of the first UCA used by the receiving apparatus, and a second value corresponding to the radius of the second UCA used by the receiving apparatus.
17. The apparatus of clause 16, wherein the message is received prior to the information indicative of the subset of antenna elements of the plurality of antenna elements to use to transmit the first OAM mode.
18. The apparatus of clause 16, wherein the message comprises the information indicative of the subset of antenna elements of the plurality of antenna elements to use to transmit the first OAM mode.
19. The apparatus of any one of clauses 15 to 18, wherein the information indicative of a subset of antenna elements of the plurality of antenna elements to use to transmit the first OAM mode comprises: a string of bits associated with the first OAM mode, wherein each bit in the string of bits indicates whether a particular UCA of the receiving apparatus received the first OAM mode.
20. The apparatus of any one of clauses 15 to 19, wherein the information indicative of a subset of antenna elements of the plurality of antenna elements to use to transmit the first OAM mode comprises: a bitmap associated with the first OAM mode, wherein a first string of bits within the bitmap indicates whether the first subset of antenna elements is to be used to transmit the first OAM mode, and a second string of bits within the bitmap indicates whether the second subset of antenna elements is to be used to transmit the first OAM mode.
21. The apparatus of any one of clauses 15 to 20, wherein execution of the instructions further causes the processor to: receive, from the receiving apparatus, at least one of: a rank indicator associated with the first OAM mode; or channel quality information associated with the first OAM mode.
22. The apparatus of any one of clauses 1 to 21, wherein execution of the instructions further causes the processor to: receive the information indicative of a subset of antenna elements of the plurality of antenna elements to use to transmit the first OAM mode via one or more of: radio resource control (RRC) signaling, medium access control (MAC) control element (CE) signaling, or physical layer signaling using at least one of downlink control information (DCI), uplink control information (UCI), or sidelink control information (SCI).
23. The apparatus of any one of clauses 1 to 22, further comprising: a first uniform circular array (UCA) comprising the first subset of antenna elements, wherein the first UCA has a first radius; and a second UCA comprising the second subset of antenna elements, wherein the second UCA has a second radius and is coaxial with the first UCA; wherein execution of the instructions further causes the processor to: determine a first channel response for the first OAM mode based on the first radius, a third radius of a third UCA used by a receiving apparatus to receive the first reference signal, a distance between the first UCA and the third UCA, and a wavelength of a waveform used to transmit first reference signal; and determine a second channel response for the first OAM mode based on the second radius, the third radius of the third UCA used by the receiving apparatus to receive the first reference signal, a distance between the first UCA and the third UCA, and the wavelength of the waveform used to transmit first reference signal.

24. The apparatus of clause 23, wherein execution of the instructions further causes the processor to: determine the first channel response based on the relationship:

$$J_n\left(2\pi\frac{r_{tx,1}r_{rx,1}}{\lambda z}\right)\exp\left\{-j\frac{2\pi}{\lambda}\left(z+\frac{r_{tx,1}^2+r_{rx,1}^2}{2z}\right)\right\},$$

where $J_n$ is a Bessel function corresponding to OAM mode n, $r_{tx,1}$ is the first radius of the first UCA, $r_{rx,1}$ is the third radius of the third UCA, $\lambda$ is a wavelength of the waveform used to transmit first reference signal, j is $\sqrt{-1}$, and z is the distance between the first UCA and the third UCA.

25. The apparatus of any one of clauses 23 or 24, wherein execution of the instructions further causes the processor to: generate a channel response matrix using at least the first channel response, the second channel response, and a rank indicator (RI) L associated with the first OAM mode.

26. The apparatus of clause 25, wherein execution of the instructions further causes the processor to: determine a precoding weight vector for the first OAM mode based on L dominant singular vectors of the channel response matrix.

27. The apparatus of clause 26, wherein execution of the instructions further causes the processor to: determine the precoding weight vector for the first OAM mode based on a singular value decomposition of the channel response matrix.

28. The apparatus of any one of clauses 1 to 27, wherein execution of the instructions further causes the processor to: transmit information indicative of a maximum number of OAM modes that the apparatus is configured to simultaneously transmit using the first subset of antenna elements.

29. An apparatus configured for wireless communication, comprising: a processor; a plurality of antenna elements, comprising a first subset of antenna elements that includes at least a first antenna element and a second antenna element, and a second subset of antenna elements that includes at least a third antenna element and a fourth antenna element; and a memory coupled to the processor, the memory storing instructions that, when executed by the processor, cause the processor to: receive, from a transmitting apparatus comprising a third subset of antenna elements and a fourth subset of antenna elements, an indication that the third subset of antenna elements are to be used to transmit a first reference signal for a first orbital angular momentum (OAM) mode; receive, from a transmitting apparatus, an indication that the fourth subset of antenna elements are to be used to transmit a second reference signal for the first OAM mode; and transmit information indicative of a subset of antenna elements of the plurality of antenna elements that was used to receive the first reference signal.

30. The apparatus of clause 29, wherein the first reference signal comprises a first channel state information reference signal (CSI-RS), and the second reference signal comprises a second CSI-RS.

31. The apparatus of any one of clauses 29 or 30, wherein execution of the instructions further causes the processor to: receive, via the first subset of antenna elements, the first reference signal; and receive, via the second subset of the plurality of antenna elements, the second reference signal.

32. The apparatus of any one of clauses 29 to 31, wherein execution of the instructions further causes the processor to: receive, from the transmitting apparatus, reference signal configuration information, wherein the reference signal configuration information includes an indication that a first subset of reference signals of a plurality of reference signals are associated with the first OAM mode, wherein the first subset of reference signals includes the first reference signal and the second reference signal.

33. The apparatus of clause 32, wherein execution of the instructions further causes the processor to: determine, based on the reference signal configuration information and a maximum number of OAM modes that the apparatus is configured to simultaneously receive using the first subset of antenna elements, that the first subset of antenna elements and the second subset of antenna elements are to be used to receive the first reference signal, and that the first subset of antenna elements and the second subset of antenna elements are to be used to receive to receive the second reference signal.

34. The apparatus of any one of clauses 32 or 33, wherein execution of the instructions further causes the processor to: determine, based on the reference signal configuration information, that the first reference signal is to be transmitted using a first uniform circular array (UCA) comprising the third subset of antenna elements; receive, via the first subset of antenna elements, the first reference signal; measure a channel based on the first reference signal; and determine a channel gain between the first UCA and the first subset of antenna elements.

35. The apparatus of any one of clauses 32 to 34, wherein execution of the instructions further causes the processor to: determine, based on the reference signal configuration information, that the first reference signal is to be transmitted using a first UCA comprising the third subset of antenna elements; receive, via the second subset of antenna elements, the first reference signal; measure a channel based on the first reference signal; and determine a channel gain between the first UCA and the second subset of antenna elements based on the channel measurement . . . .

36. The apparatus of any one of clauses 32 to 35, wherein execution of the instructions further causes the processor to: receive information indicative of a maximum number of OAM modes that the transmitting apparatus is configured to simultaneously transmit using a first uniform circular array (UCA).

37. The apparatus of clause 36, wherein execution of the instructions further causes the processor to: determine a first channel gain between the first UCA and the first subset of antenna elements; determine a second channel gain between the first UCA and the second subset of antenna elements; and select a UCA to be used to transmit using the first OAM mode based on the first channel gain, the second channel gain, and the maximum number of OAM modes that the transmitting apparatus is configured to simultaneously transmit using the first UCA.

38. The apparatus of clause 37, wherein execution of the instructions further causes the processor to: transmit, to the transmitting apparatus, information indicative of the selected UCA.

39. The apparatus of any one of clauses 32 to 38, wherein the reference signal configuration information includes an indication that a second subset of reference signals of the plurality of reference signals are associated with a second OAM mode.

40. The apparatus of any one of clauses 32 to 39, wherein the reference signal configuration information includes the indication that the third subset of antenna elements are to be used to transmit the first reference signal for the first OAM mode, and the indication that the fourth subset of antenna elements are to be used to transmit the second reference signal for the first OAM mode.

41. The apparatus of any one of clauses 32 to 40, wherein the reference signal configuration information comprises information indicating that the third subset of antenna elements corresponds to a first CSI-RS resource, and information indicating that the fourth subset of antenna elements corresponds to a second CSI-RS resource.

42. The apparatus of clause 41, wherein the reference signal configuration information comprises information indicating that the first reference signal is to be transmitted using a first port of the first CSI-RS resource, and information indication that the second reference signal is to be transmitted using a first port of the second CSI-RS resource.

43. The apparatus of clause 42, wherein the reference signal configuration information comprises information indicating that a third reference signal is to be transmitted using a second port of the first CSI-RS resource, and information indication that a fourth reference signal is to be transmitted using a second port of the second CSI-RS resource.

44. The apparatus of any one of clauses 32 to 41, wherein the reference signal configuration information comprises information indicating that the first subset of antenna elements corresponds to a first CSI-RS resource set, and information indicating that the second subset of antenna elements corresponds to a second CSI-RS resource set.

45. The apparatus of clause 44, wherein the reference signal configuration information comprises information indicating that the first reference signal is to be transmitted using a first resource of the first CSI-RS resource set, and information indication that the second reference signal is to be transmitted using a first resource of the second CSI-RS resource set.

46. The apparatus of clause 45, wherein the reference signal configuration information comprises information indicating that a third reference signal is to be transmitted using a second resource of the first CSI-RS resource set, and information indication that a fourth reference signal is to be transmitted using a second resource of the second CSI-RS resource set . . . .

47. The apparatus of any one of clauses 32 to 46, wherein the reference signal configuration information comprises an OAM mode index parameter associated with the first reference signal that indicates which OAM mode is to be used to transmit the first reference signal.

48. The apparatus of any one of clauses 29 to 47, wherein execution of the instructions further causes the processor to: receive, via the first subset of antenna elements, a third reference signal using a second OAM mode; receive, via the second subset of antenna elements, a fourth reference signal using the second OAM mode; and transmit information indicative of a subset of antenna elements of the plurality of antenna elements that was used to receive the third reference signal and a subset of antenna elements of the plurality of antenna elements that was used to receive the fourth reference signal.

49. The apparatus of any one of clauses 29 to 48, further comprising: a first receiver uniform circular array (UCA) comprising the first subset of antenna elements, wherein the first receiver UCA has a first radius; and a second receiver UCA comprising the second subset of antenna elements, wherein the second receiver UCA has a second radius and is coaxial with the first UCA.

50. The apparatus of any one of clauses 29 to 49, wherein execution of the instructions further causes the processor to: transmit information indicative of a subset of antenna elements of the plurality of antenna elements to use to transmit the first OAM mode.

51. The apparatus of clause 50, wherein the information indicative of a subset of antenna elements of the plurality of antenna elements to use to transmit the first OAM mode comprises: information indicative of a radius of a first uniform circular array (UCA) used by the apparatus to receive the first reference signal; and information indicative of a radius of a second UCA used by the apparatus to receive the second reference signal.

52. The apparatus of clause 51, wherein execution of the instructions further causes the processor to: transmit a message comprising a first value corresponding to the radius of the first UCA, and a second value corresponding to the radius of the second UCA.

53. The apparatus of clause 52, wherein the message is transmitted prior to the information indicative of the subset of antenna elements of the plurality of antenna elements to use to transmit the first OAM mode.

54. The apparatus of clause 52, wherein the message comprises the information indicative of the subset of antenna elements of the plurality of antenna elements to use to transmit the first OAM mode.

55. The apparatus of any one of clauses 51 to 54, wherein the information indicative of a subset of antenna elements of the plurality of antenna elements to use to transmit the first OAM mode comprises: a string of bits associated with the first OAM mode, wherein each bit in the string of bits indicates whether a particular UCA of the apparatus received the first OAM mode.

56. The apparatus of any one of clauses 51 to 55, wherein the information indicative of a subset of antenna elements of the plurality of antenna elements to use to transmit the first OAM mode comprises: a bitmap associated with the first OAM mode, wherein a first string of bits within the bitmap indicates whether the first subset of antenna elements is to be used to transmit the first OAM mode, and a second string of bits within the bitmap indicates whether the second subset of antenna elements is to be used to transmit the first OAM mode.

57. The apparatus of any one of clauses 51 to 56, wherein execution of the instructions further causes the processor to: transmit, to the transmitting apparatus, at least one of: a rank indicator associated with the first OAM mode; or channel quality information associated with the first OAM mode.

58. The apparatus of any one of clauses 51 to 57, wherein execution of the instructions further causes the processor to: transmit the information indicative of a subset of antenna elements of the plurality of antenna elements to use to transmit the first OAM mode via one or more of: radio resource control (RRC) signaling, medium access control (MAC) control element (CE) signaling, or physical layer signaling using at least one of downlink control information (DCI), uplink control information (UCI), or sidelink control information (SCI).

59 The apparatus of any one of clauses 29 to 58, wherein execution of the instructions further causes the processor to: transmit the information indicative of the subset of antenna elements of the plurality of antenna elements that was used to receive the first reference signal via one or more of: radio resource control (RRC) signaling, medium access control (MAC) control element (CE) signaling, or physical layer signaling using at least one of downlink control information (DCI), uplink control information (UCI), or sidelink control information (SCI) . . .

60. A method for wireless communication, comprising: transmitting, via a first subset of antenna elements of a plurality of antenna elements, a first reference signal using a first orbital angular momentum (OAM) mode; transmitting, via a second subset of antenna elements of a plurality of antenna elements, a second reference signal using the first OAM mode; and receiving information indicative of a subset of antenna elements of the plurality of antenna elements to use to transmit the first OAM mode.

61. The method of clause 60, wherein the first reference signal comprises a first channel state information reference signal (CSI-RS), and the second reference signal comprises a second CSI-RS.

62. The method of clause 60, further comprising: transmitting reference signal configuration information that indicates that a first subset of reference signals of a plurality of reference signals are associated with the first OAM mode . . .

63. The method of clause 62, wherein the reference signal configuration information indicates that a second subset of reference signals of the plurality of reference signals are associated with a second OAM mode.

64. The method of any one of clauses 62 or 63, wherein the reference signal configuration information indicates that the first subset of antenna elements are to be used to transmit the first reference signal, and that the second subset of antenna elements are to be used to transmit the second reference signal.

65. The method of any one of clauses 62 to 64, wherein the reference signal configuration information comprises information indicating that the first subset of antenna elements corresponds to a first CSI-RS resource, and information indicating that the second subset of antenna elements corresponds to a second CSI-RS resource.

66. The method of clause 65, wherein the reference signal configuration information comprises information indicating that the first reference signal is to be transmitted using a first port of the first CSI-RS resource, and information indication that the second reference signal is to be transmitted using a first port of the second CSI-RS resource.

67. The method of clause 66, wherein the reference signal configuration information comprises information indicating that a third reference signal is to be transmitted using a second port of the first CSI-RS resource, and information indication that a fourth reference signal is to be transmitted using a second port of the second CSI-RS resource.

68. The method of any one of clauses 62 to 64, wherein the reference signal configuration information comprises information indicating that the first subset of antenna elements corresponds to a first CSI-RS resource set, and information indicating that the second subset of antenna elements corresponds to a second CSI-RS resource set.

69. The method of clause 68, wherein the reference signal configuration information comprises information indicating that the first reference signal is to be transmitted using a first resource of the first CSI-RS resource set, and information indication that the second reference signal is to be transmitted using a first resource of the second CSI-RS resource set.

70. The method of clause 69, wherein the reference signal configuration information comprises information indicating that a third reference signal is to be transmitted using a second resource of the first CSI-RS resource set, and information indication that a fourth reference signal is to be transmitted using a second resource of the second CSI-RS resource set . . .

71. The method of any one of clauses 62 to 70, wherein the reference signal configuration information comprises an OAM mode index parameter associated with the first reference signal that indicates which OAM mode is to be used to transmit the first reference signal . . .

72. The method of any one of clauses 60 to 71, further comprising: transmitting, via the first subset of antenna elements, a third reference signal using third resources and a second OAM mode; transmitting, via the second subset of antenna elements, a fourth reference signal using fourth resources and the second OAM mode; and receiving information indicative of a subset of antenna elements of the plurality of antenna elements to use to transmit the second OAM mode.

73. The method of clause 60, wherein the first subset of antenna elements are included in a first uniform circular array (UCA) having a first radius; and the second subset of antenna elements are included in a second UCA having a second radius and that is coaxial with the first UCA.

74. The method of any one of clauses 60 to 73, wherein the information indicative of a subset of antenna elements of the plurality of antenna elements to use to transmit the first OAM mode comprises: information indicative of a radius of a first uniform circular array (UCA) used by a receiving apparatus to receive the first reference signal; and information indicative of a radius of a second UCA used by the receiving apparatus to receive the second reference signal.

75. The method of clause 74, further comprising: receiving a message comprising a first value corresponding to the radius of the first UCA used by the receiving apparatus, and a second value corresponding to the radius of the second UCA used by the receiving apparatus.

76. The method of clause 75, wherein the message is received prior to the information indicative of the subset of antenna elements of the plurality of antenna elements to use to transmit the first OAM mode.

77. The method of clause 75, wherein the message comprises the information indicative of the subset of antenna elements of the plurality of antenna elements to use to transmit the first OAM mode.

78. The method of any one of clauses 15 to 18, wherein the information indicative of a subset of antenna elements of the plurality of antenna elements to use to transmit the first OAM mode comprises: a string of bits associated with the first OAM mode, wherein each bit in the string of bits indicates whether a particular UCA of the receiving apparatus received the first OAM mode.

79. The method of any one of clauses 74 to 78, wherein the information indicative of a subset of antenna elements of the plurality of antenna elements to use to transmit the first OAM mode comprises: a bitmap associated with the first OAM mode, wherein a first string of bits within the bitmap indicates whether the first subset of antenna elements is to be used to transmit the first OAM mode, and a second string of bits within the bitmap indicates whether the second subset of antenna elements is to be used to transmit the first OAM mode.

80. The method of any one of clauses 74 to 79, further comprising: receiving, from the receiving apparatus, at least one of: a rank indicator associated with the first OAM mode; or channel quality information associated with the first OAM mode.

81. The method of any one of clauses 1 to 21, further comprising: receiving the information indicative of a subset of antenna elements of the plurality of antenna elements to use to transmit the first OAM mode via one or more of: radio resource control (RRC) signaling, medium access control (MAC) control element (CE) signaling, or physical layer signaling using at least one of downlink control information (DCI), uplink control information (UCI), or sidelink control information (SCI).

82. The method of any one of clauses 60 to 81, wherein the first subset of antenna elements are included in a first uniform circular array (UCA) having a first radius; and the second subset of antenna elements are included in a second UCA having a second radius and that is coaxial with the first UCA; the method further comprising: determining a first channel response for the first OAM mode based on the first radius, a third radius of a third UCA used by a receiving apparatus to receive the first reference signal, a distance between the first UCA and the third UCA, and a wavelength of a waveform used to transmit first reference signal; and determining a second channel response for the first OAM mode based on the second radius, the third radius of the third UCA used by the receiving apparatus to receive the first reference signal, a distance between the first UCA and the third UCA, and the wavelength of the waveform used to transmit first reference signal.

83. The method of clause 82, further comprising: determining the first channel response based on the relationship:

$$J_n\left(2\pi\frac{r_{tx,1}r_{rx,1}}{\lambda z}\right)\exp\left\{-j\frac{2\pi}{\lambda}\left(z+\frac{r_{tx,1}^2+r_{rx,1}^2}{2z}\right)\right\},$$

where $J_n$ is a Bessel function corresponding to OAM mode n, $r_{tx,1}$ is the first radius of the first UCA, $r_{rx,1}$ is the third radius of the third UCA, $\lambda$ is a wavelength of the waveform used to transmit first reference signal, j is $\sqrt{-1}$, and z is the distance between the first UCA and the third UCA.

84. The method of any one of clauses 82 or 83, further comprising: generating a channel response matrix using at least the first channel response, the second channel response, and a rank indicator (RI) L associated with the first OAM mode.

85. The method of clause 84, further comprising: determining a precoding weight vector for the first OAM mode based on L dominant singular vectors of the channel response matrix.

86. The method of clause 85, further comprising: determining the precoding weight vector for the first OAM mode based on a singular value decomposition of the channel response matrix.

87. The method of any one of clauses 60 to 86, further comprising: transmitting information indicative of a maximum number of OAM modes that the apparatus is configured to simultaneously transmit using the first subset of antenna elements.

88. A method for wireless communication, comprising: receiving, at a receiving apparatus comprising a plurality of antenna elements including a first subset of antenna elements and a second subset of antenna elements and from a transmitting apparatus comprising a third subset of antenna elements and a fourth subset of antenna elements, an indication that the third subset of antenna elements are to be used to transmit a first reference signal for a first orbital angular momentum (OAM) mode; receiving, from the transmitting apparatus, an indication that the fourth subset of antenna elements are to be used to transmit a second reference signal for the first OAM mode; and transmitting information indicative of a subset of antenna elements of the plurality of antenna elements that was used to receive the first reference signal.

89. The method of clause 88, wherein the first reference signal comprises a first channel state information reference signal (CSI-RS), and the second reference signal comprises a second CSI-RS.

90. The method of any one of clauses 88 or 89, further comprising: receiving, via the first subset of antenna elements of the plurality of antenna elements, the first reference signal; and receiving, via the second subset of the plurality of antenna elements, the second reference signal.

91. The method of any one of clauses 88 to 90, further comprising: receiving, from the transmitting apparatus, reference signal configuration information, wherein the reference signal configuration information includes an indication that a first subset of reference signals of a plurality of reference signals are associated with the first OAM mode, wherein the first subset of reference signals includes the first reference signal and the second reference signal.

92. The method of clause 91, further comprising: determining, based on the reference signal configuration information and a maximum number of OAM modes that the method is configured to simultaneously receive using the first subset of antenna elements, that the first subset of antenna elements and the second subset of antenna elements are to be used to receive the first reference signal, and that the first subset of antenna elements and the second subset of antenna elements are to be used to receive to receive the second reference signal.

93. The method of any one of clauses 91 or 92, further comprising: determining, based on the reference signal configuration information, that the first reference signal is to be transmitted using a first uniform circular array (UCA) comprising the third subset of antenna elements; receiving, via the first subset of antenna elements, the first reference signal; measuring a channel based on the first reference signal; and determining a channel gain between the first UCA and the first subset of antenna elements.

94. The method of any one of clauses 91 to 93, further comprising: determining, based on the reference signal configuration information, that the first reference signal is to be transmitted using a first UCA comprising the third subset of antenna elements; receiving, via the second subset of antenna elements, the first reference signal; measuring a channel based on the first reference signal; and determining a channel gain between the first UCA and the second subset of antenna elements based on the channel measurement . . .

95. The method of any one of clauses 91 to 94, further comprising: receiving information indicative of a maximum number of OAM modes that the transmitting method is configured to simultaneously transmit using a first uniform circular array (UCA).

96. The method of clause 95, further comprising: determining a first channel gain between the first UCA and the first subset of antenna elements; determining a second channel gain between the first UCA and the second subset of antenna elements; and selecting a UCA to be used to transmit using the first OAM mode based on the first channel gain, the second channel gain, and the maximum number of OAM modes that the transmitting apparatus is configured to simultaneously transmit using the first UCA.

97. The method of clause 96, further comprising: transmitting, to the transmitting apparatus, information indicative of the selected UCA.

98. The method of any one of clauses 91 to 97, wherein the reference signal configuration information includes an indication that a second subset of reference signals of the plurality of reference signals are associated with a second OAM mode.

99. The method of any one of clauses 91 to 98, wherein the reference signal configuration information includes the indication that the third subset of antenna elements are to be used to transmit the first reference signal for the first OAM mode, and the indication that the fourth subset of antenna elements are to be used to transmit the second reference signal for the first OAM mode.

100. The method of any one of clauses 91 to 99, wherein the reference signal configuration information comprises information indicating that the third subset of antenna elements corresponds to a first CSI-RS resource, and information indicating that the fourth subset of antenna elements corresponds to a second CSI-RS resource.

101. The method of clause 100, wherein the reference signal configuration information comprises information indicating that the first reference signal is to be transmitted using a first port of the first CSI-RS resource, and information indication that the second reference signal is to be transmitted using a first port of the second CSI-RS resource.

102. The method of clause 101, wherein the reference signal configuration information comprises information indicating that a third reference signal is to be transmitted using a second port of the first CSI-RS resource, and information indication that a fourth reference signal is to be transmitted using a second port of the second CSI-RS resource.

103. The method of any one of clauses 91 to 100, wherein the reference signal configuration information comprises information indicating that the first subset of antenna elements corresponds to a first CSI-RS resource set, and information indicating that the second subset of antenna elements corresponds to a second CSI-RS resource set.

104. The method of clause 103, wherein the reference signal configuration information comprises information indicating that the first reference signal is to be transmitted using a first resource of the first CSI-RS resource set, and information indication that the second reference signal is to be transmitted using a first resource of the second CSI-RS resource set.

105. The method of clause 104, wherein the reference signal configuration information comprises information indicating that a third reference signal is to be transmitted using a second resource of the first CSI-RS resource set, and information indication that a fourth reference signal is to be transmitted using a second resource of the second CSI-RS resource set . . .

106. The method of any one of clauses 91 to 105, wherein the reference signal configuration information comprises an OAM mode index parameter associated with the first reference signal that indicates which OAM mode is to be used to transmit the first reference signal.

107. The method of any one of clauses 88 to 106, further comprising: receiving, via the first subset of antenna elements, a third reference signal using a second OAM mode; receiving, via the second subset of antenna elements, a fourth reference signal using the second OAM mode; and transmitting information indicative of a subset of antenna elements of the plurality of antenna elements that was used to receive the third reference signal and a subset of antenna elements of the plurality of antenna elements that was used to receive the fourth reference signal.

108. The method of any one of clauses 88 to 107, wherein the first subset of antenna elements is included in a first receiver uniform circular array (UCA) having a first radius; and the second subset of antenna elements is included in a second receiver UCA having a second radius and that is coaxial with the first UCA.

109. The method of any one of clauses 88 to 108, further comprising: transmitting information indicative of a subset of antenna elements of the plurality of antenna elements to use to transmit the first OAM mode.

110. The method of clause 109, wherein the information indicative of a subset of antenna elements of the plurality of antenna elements to use to transmit the first OAM mode comprises: information indicative of a radius of a first uniform circular array (UCA) used by the method to receive the first reference signal; and information indicative of a radius of a second UCA used by the method to receive the second reference signal.

111. The method of clause 110, further comprising: transmitting a message comprising a first value corresponding to the radius of the first UCA, and a second value corresponding to the radius of the second UCA.

112. The method of clause 111, wherein the message is transmitted prior to the information indicative of the subset of antenna elements of the plurality of antenna elements to use to transmit the first OAM mode.

113. The method of clause 111, wherein the message comprises the information indicative of the subset of antenna elements of the plurality of antenna elements to use to transmit the first OAM mode.

114. The method of any one of clauses 110 to 113, wherein the information indicative of a subset of antenna elements of the plurality of antenna elements to use to transmit the first OAM mode comprises: a string of bits associated with the first OAM mode, wherein each bit in the string of bits indicates whether a particular UCA of the method received the first OAM mode.

115. The method of any one of clauses 110 to 114, wherein the information indicative of a subset of antenna elements of the plurality of antenna elements to use to transmit the first OAM mode comprises: a bitmap associated with the first OAM mode, wherein a first string of bits within the bitmap indicates whether the first subset of antenna elements is to be used to transmit the first OAM mode, and a second string of bits within the bitmap indicates whether the second subset of antenna elements is to be used to transmit the first OAM mode.

116. The method of any one of clauses 110 to 115, further comprising: transmitting, to the transmitting method, at least one of: a rank indicator associated with the first OAM mode; or channel quality information associated with the first OAM mode.

117. The method of any one of clauses 110 to 116, further comprising: transmitting the information indicative of a subset of antenna elements of the plurality of antenna elements to use to transmit the first OAM mode via one or more of: radio resource control (RRC) signaling, medium access control (MAC) control element (CE) signaling, or physical layer signaling using at least one of downlink control information (DCI), uplink control information (UCI), or sidelink control information (SCI).

118. The method of any one of clauses 88 to 117, further comprising: transmitting the information indicative of the subset of antenna elements of the plurality of antenna elements that was used to receive the first reference signal via one or more of: radio resource control (RRC) signaling, medium access control (MAC) control element (CE) signaling, or physical layer signaling using at least one of downlink control information (DCI), uplink control information (UCI), or sidelink control information (SCI).

119. An apparatus for wireless communication, comprising: a processor; and a memory communicatively coupled to the at least one processor, wherein the processor is configured to: perform a method of any of clauses 60 to 118.

120. A non-transitory computer-readable medium storing computer-executable code, comprising code for causing a computer to cause a processor to: perform a method of any of clauses 60 to 118.

121. An apparatus for wireless communication, comprising: at least one means for carrying out a method of any of clauses 60 to 118.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus configured for wireless communication, comprising:

a processor;

a plurality of antenna elements, comprising a first subset of antenna elements that includes at least a first antenna element and a second antenna element, and a second subset of antenna elements that includes at least a third antenna element and a fourth antenna element; and a memory coupled to the processor, the memory storing instructions that, when executed by the processor, cause the processor to:

transmit, via the first subset of antenna elements, a first reference signal using a first orbital angular momentum (OAM) mode;

transmit, via the second subset of antenna elements, a second reference signal using the first OAM mode; and receive information indicative of a subset of antenna elements of the plurality of antenna elements to use to transmit the first OAM mode.

2. The apparatus of claim 1, wherein the first reference signal comprises a first channel state information reference signal (CSI-RS), and the second reference signal comprises a second CSI-RS.

3. The apparatus of claim 1, wherein execution of the instructions further causes the processor to:

transmit reference signal configuration information that indicates that a first subset of reference signals of a plurality of reference signals are associated with the first OAM mode.

4. The apparatus of claim 3, wherein the reference signal configuration information indicates that a second subset of reference signals of the plurality of reference signals are associated with a second OAM mode.

5. The apparatus of claim 3, wherein the reference signal configuration information comprises information indicating that the first subset of antenna elements corresponds to a first CSI-RS resource, and information indicating that the second subset of antenna elements corresponds to a second CSI-RS resource.

6. The apparatus of claim 1, wherein execution of the instructions further causes the processor to:

receive, from a receiving apparatus, at least one of:

a rank indicator associated with the first OAM mode; or channel quality information associated with the first OAM mode.

7. The apparatus of claim 1, further comprising:

a first uniform circular array (UCA) comprising the first subset of antenna elements, wherein the first UCA has a first radius; and a second UCA comprising the second subset of antenna elements, wherein the second UCA has a second radius and is coaxial with the first UCA;

wherein execution of the instructions further causes the processor to:

determine a first channel response for the first OAM mode based on the first radius, a third radius of a third UCA used by a receiving apparatus to receive the first reference signal, a distance between the first UCA and the third UCA, and a wavelength of a waveform used to transmit first reference signal; and determine a second channel response for the first OAM mode based on the second radius, the third radius of the third UCA used by the receiving apparatus to receive the first reference signal, a distance between the first UCA and the third UCA, and the wavelength of the waveform used to transmit first reference signal.

8. An apparatus configured for wireless communication, comprising:

a processor;

a plurality of antenna elements, comprising a first subset of antenna elements that includes at least a first antenna element and a second antenna element, and a second subset of antenna elements that includes at least a third antenna element and a fourth antenna element; and a memory coupled to the processor, the memory storing instructions that, when executed by the processor, cause the processor to:

receive, from a transmitting apparatus comprising a third subset of antenna elements and a fourth subset of antenna elements, an indication that the third subset of antenna elements are to be used to transmit a first reference signal for a first orbital angular momentum (OAM) mode;

receive, from the transmitting apparatus, an indication that the fourth subset of antenna elements are to be used to transmit a second reference signal for the first OAM mode; and transmit information indicative of a subset of antenna elements of the plurality of antenna elements that was used to receive the first reference signal.

9. The apparatus of claim 8, wherein execution of the instructions further causes the processor to:

receive, via the first subset of antenna elements of the plurality of antenna elements, the first reference signal; and receive, via the second subset of the plurality of antenna elements, the second reference signal.

10. The apparatus of claim 8, wherein execution of the instructions further causes the processor to:

receive, from the transmitting apparatus, reference signal configuration information, wherein the reference signal configuration information includes an indication that a first subset of reference signals of a plurality of reference signals are associated with the first OAM mode, wherein the first subset of reference signals includes the first reference signal and the second reference signal.

11. The apparatus of claim 10, wherein execution of the instructions further causes the processor to:

determine, based on the reference signal configuration information, that the first reference signal is to be transmitted using a first uniform circular array (UCA) comprising the third subset of antenna elements;

receive, via the first subset of antenna elements, the first reference signal;

measure a channel based on the first reference signal; and determine a channel gain between the first UCA and the first subset of antenna elements.

12. The apparatus of claim 10, wherein execution of the instructions further causes the processor to:

receive information indicative of a maximum number of OAM modes that the transmitting apparatus is configured to simultaneously transmit using a first uniform circular array (UCA).

13. The apparatus of claim 12, wherein execution of the instructions further causes the processor to:

determine a first channel gain between the first UCA and the first subset of antenna elements;

determine a second channel gain between the first UCA and the second subset of antenna elements; and select a UCA to be used to transmit using the first OAM mode based on the first channel gain, the second channel gain, and the maximum number of OAM modes that the transmitting apparatus is configured to simultaneously transmit using the first UCA.

14. The apparatus of claim 8, wherein execution of the instructions further causes the processor to:

transmit information indicative of a subset of antenna elements of the plurality of antenna elements to use to transmit the first OAM mode.

15. The apparatus of claim 14, wherein the information indicative of a subset of antenna elements of the plurality of antenna elements to use to transmit the first OAM mode comprises:

information indicative of a radius of a first uniform circular array (UCA) used by the apparatus to receive the first reference signal; and information indicative of a radius of a second UCA used by the apparatus to receive the second reference signal.

16. A method for wireless communication, comprising:

transmitting, via a first subset of antenna elements of a plurality of antenna elements, a first reference signal using a first orbital angular momentum (OAM) mode;

transmitting, via a second subset of antenna elements of a plurality of antenna elements, a second reference signal using the first OAM mode; and receiving information indicative of a subset of antenna elements of the plurality of antenna elements to use to transmit the first OAM mode.

17. The method of claim 16, wherein the first reference signal comprises a first channel state information reference signal (CSI-RS), and the second reference signal comprises a second CSI-RS.

18. The method of claim 16, further comprising:

transmitting reference signal configuration information that indicates that a first subset of reference signals of a plurality of reference signals are associated with the first OAM mode.

19. The method of claim 18, wherein the reference signal configuration information indicates that a second subset of reference signals of the plurality of reference signals are associated with a second OAM mode.

20. The method of claim 18, wherein the reference signal configuration information comprises information indicating that the first subset of antenna elements corresponds to a first CSI-RS resource, and information indicating that the second subset of antenna elements corresponds to a second CSI-RS resource.

21. The method of claim 16, further comprising:

receiving, from a receiving apparatus, at least one of:

a rank indicator associated with the first OAM mode; or channel quality information associated with the first OAM mode.

22. The method claim 16, wherein the first subset of antenna elements are included in a first uniform circular array (UCA) having a first radius; and the second subset of antenna elements are included in a second UCA having a second radius and that is coaxial with the first UCA;

the method further comprising:

determining a first channel response for the first OAM mode based on the first radius, a third radius of a third UCA used by a receiving apparatus to receive the first reference signal, a distance between the first UCA and the third UCA, and a wavelength of a waveform used to transmit first reference signal; and determining a second channel response for the first OAM mode based on the second radius, the third radius of the third UCA used by the receiving apparatus to receive the first reference signal, a distance between the first UCA and the third UCA, and the wavelength of the waveform used to transmit first reference signal.

23. A method for wireless communication, comprising:

receiving, at a receiving apparatus comprising a plurality of antenna elements including a first subset of antenna elements and a second subset of antenna elements and from a transmitting apparatus comprising a third subset of antenna elements and a fourth subset of antenna elements, an indication that the third subset of antenna elements are to be used to transmit a first reference signal for a first orbital angular momentum (OAM) mode;

receiving, from the transmitting apparatus, an indication that the fourth subset of antenna elements are to be used to transmit a second reference signal for the first OAM mode; and transmitting information indicative of a subset of antenna elements of the plurality of antenna elements that was used to receive the first reference signal.

24. The method of claim 23, further comprising:

receiving, via the first subset of antenna elements of the plurality of antenna elements, the first reference signal; and receiving, via the second subset of the plurality of antenna elements, the second reference signal.

25. The method of claim 23, further comprising:

receiving, from the transmitting apparatus, reference signal configuration information, wherein the reference signal configuration information includes an indication that a first subset of reference signals of a plurality of reference signals are associated with the first OAM mode, wherein the first subset of reference signals includes the first reference signal and the second reference signal.

26. The method of claim 25, further comprising:

determining, based on the reference signal configuration information, that the first reference signal is to be transmitted using a first uniform circular array (UCA) comprising the third subset of antenna elements;

receiving, via the first subset of antenna elements, the first reference signal;

measuring a channel based on the first reference signal; and determining a channel gain between the first UCA and the first subset of antenna elements.

27. The method of claim 25, further comprising:

receiving information indicative of a maximum number of OAM modes that the transmitting apparatus is configured to simultaneously transmit using a first uniform circular array (UCA).

28. The method of claim 27, further comprising:

determining a first channel gain between the first UCA and the first subset of antenna elements;

determining a second channel gain between the first UCA and the second subset of antenna elements; and selecting a UCA to be used to transmit using the first OAM mode based on the first channel gain, the second channel gain, and the maximum number of OAM modes that the transmitting apparatus is configured to simultaneously transmit using the first UCA.

29. The method of claim 23, further comprising:

transmitting information indicative of a subset of antenna elements of the plurality of antenna elements to use to transmit the first OAM mode.

30. The method of claim 29, wherein the information indicative of a subset of antenna elements of the plurality of antenna elements to use to transmit the first OAM mode comprises:

information indicative of a radius of a first uniform circular array (UCA) used by the method to receive the first reference signal; and information indicative of a radius of a second UCA used by the method to receive the second reference signal.

* * * * *